United States Patent [19]
Hayden et al.

[11] Patent Number: 5,745,759
[45] Date of Patent: Apr. 28, 1998

[54] WINDOW KERNEL

[75] Inventors: Patrick M. Hayden, Nepean; Robin A. Burgener, Ottawa, both of Canada

[73] Assignee: QNX Software Systems, Ltd., Ontario, Canada

[21] Appl. No.: 323,354

[22] Filed: Oct. 14, 1994

[51] Int. Cl.$^6$ .................................................. G06F 9/40
[52] U.S. Cl. ............................................................ 395/680
[58] Field of Search ........................... 395/700, 346, 395/329, 335, 680

[56] References Cited

U.S. PATENT DOCUMENTS

| | | | |
|---|---|---|---|
| 4,875,162 | 10/1989 | Ferriter et al. | 364/401 |
| 4,951,196 | 8/1990 | Jackson | 364/401 |
| 5,057,996 | 10/1991 | Cutler et al. | 364/200 |
| 5,136,712 | 8/1992 | Perazzoli, Jr. et al. | 395/700 |
| 5,263,134 | 11/1993 | Paal et al. | 395/158 |
| 5,297,283 | 3/1994 | Kelley, Jr. et al. | 395/650 |
| 5,341,472 | 8/1994 | Leak | 395/166 |
| 5,408,600 | 4/1995 | Garfinkel et al. | 395/329 |
| 5,408,602 | 4/1995 | Giokas et al. | 395/329 |
| 5,579,413 | 11/1996 | Bjontegaard | 382/248 |

FOREIGN PATENT DOCUMENTS

| | | | |
|---|---|---|---|
| 1213085 | 10/1986 | Canada | 375/12 |
| 2053177 | 10/1991 | Canada | G09G 5/34 |
| 2077173 | 8/1992 | Canada | G09G 5/00 |
| 2000009 | 2/1994 | Canada | G06F 9/00 |
| 2036858 | 3/1994 | Canada | G06F 9/445 |
| 2053344 | 3/1994 | Canada | G06F 9/00 |
| 2029088 | 5/1994 | Canada | G06F 9/40 |
| WO9427278 | 11/1994 | WIPO | G09G 5/14 |
| WO9429793 | 12/1994 | WIPO | G06F 9/44 |

OTHER PUBLICATIONS

Coombes, Jennifer and Smith, Christine, "On the Road with QNX'93", QNXnews, vol. 7, No. 4 Feb. 1994.

Hildebrand, Dan, "QNX®: Microkernel Technology for Open Systems Handheld Computing", QNZ Software Systems, Ltd., pp. 1–20, May 1994.

QNX Products Update, "QNXnews", vol. 8, No. 3, pp. 19–21, Sep. 1994.

Pietrek, Matt, "Inside the Windows messaging system: opening up the heart of Windows", Dr. Dobb's Journal, v18, n2, p72(8), Feb. 1993.

Varhol, Peter D., "QNX Forges Ahead: Outfitted with a new graphics microkernel, this compact, modular, and efficient real-time operating system supports an expanding range of applications", BYTE, p. 199, vol. 19, No. 10, Oct. 1994.

Stevens, Al, "A Multitool approach to Windows development", Dr. Dobb's Journal, v18, n10, p7(7), 1993.

Klein, Mike, "The Windows messaging system", C Users Journal, v11, n5, p70(9), May 1993.

*Primary Examiner*—Alvin E. Oberley
*Assistant Examiner*—St. John Courtenay, III
*Attorney, Agent, or Firm*—Wilson Sonsini Goodrich & Rosati

[57] ABSTRACT

A system for managing the interaction of programs is provided, comprising means for storing a set of predetermined characteristics respecting each program to be managed, each set of characteristics including an input signal type characteristic indicative of the identity of the type of inputs signals to which the program associated with the set of characteristics is responsive and a signal modification characteristic indicative of whether a type of input signal is to be modified by the associated program; means responsive to input signals having predetermined properties emitted from one of the programs for interrogating each set of predetermined characteristics in a predetermined sequence, determining whether the associated program is responsive to a current input signal, determining whether the properties of the current input signal are to be modified and, if so, modifying the properties of the input signal; and means for emitting an output signal to the programs determined to be responsive to the input signal.

21 Claims, 21 Drawing Sheets

WINDOW KERNEL

The present invention relates to a mechanism for implementing an efficient microkernel architecture for constructing graphical user interfaces capable of scalable embedded, desktop and network distributed applications. The invention disclosed broadly relates to graphical user interfaces (GUI's) and particularly relates to the software architectures used to implement them.

BACKGROUND OF THE INVENTION

Much like operating systems (OS's) of the 1980's and earlier, which used a monolithic kernel architecture, windowing systems or graphical user interfaces (GUI's) of the 1980's and 1990's have also been implemented with a monolithic kernel. Graphics drivers, input device drivers, and the other functionality of these GUI's all exist within the common address space of the GUI kernel.

In the 1990's, many OS vendors started experimenting with microkernel operating systems, recognizing that this architecture provided the best approach to delivering the new functionality demanded by their customers. For the same reasons that a microkernel architecture has been adopted in the OS community, the GUI community needs to also adopt a microkernel approach.

Description of a Microkernel OS

The basic idea behind a microkernel architecture is to abstract out the core services or "primitives" from which the higher level functionality of the environment can be constructed. The resulting microkernel can be relatively simple. The "art" of microkernel design is in deciding which core services are essential to have within the kernel, and which should be implemented external to the microkernel. Engineering the architecture requires a constant analysis of conflicting trade-offs as pursuing certain design ideals will adversely impact other goals of the system (eg. performance, flexibility, etc).

Historically, OS functionality was implemented within a monolithic kernel to minimize the number of times time-consuming address space transitions were executed in the process of servicing an application request. Rather than having all of the functionality of the OS implemented in a single monolithic kernel that application processes call into, a microkernel OS is implemented as a tiny kernel that does only inter-process communication (IPC) and process scheduling. External processes then use these core services to implement the remainder of the OS functionally. The removal of complexity from the kernel allows a more efficient IPC implementation, which reduces the performance penalty incurred (from communicating with external service-providing processes) to the point that it becomes comparable in performance to the monolithic functional equivalent.

Splitting the monolithic kernel into separate processes also enables the easier implementation of new functionality. For example, by making the microkernel IPC network transparent, the service providing processes can be run on any node on a network, yet still be locally accessible to application processes. This serves to make all resources available to all processes, whether local or network remote. Monolithic kernels have a very difficult time attempting this functionality with efficiency because the "single component kernel" cannot be easily split across processor boundaries.

Problems With the Current State of the Art

Network distributed computing environments and embedded GUI applications have become common due to increasing integration and decreasing hardware costs. Customer demands for even greater flexibility continue to increase. For example, the growing popularity of mobile hand-held computing devices or Personal Digital Assistants (PDA's). For reasons of cost sensitivity, battery life and physical size restrictions, the hardware resources of PDA's are significantly more limited than those of conventional desktop systems. As a result, there is a need for PDA software to make efficient use of these limited resources, which presents a number of challenges to developers. This is one example where many of the GUI development obstacles are satisfied by the inherent design flexibility of a microkernel architecture.

Since a desktop system can run a more complete version of the same software environment that will run on an embedded application platform, the desktop PC also becomes a natural development platform for the embedded application, rather than incurring the inconvenience of a cross-development environment. Being able to use visual and textual tools to directly create, compile and debug the PDA or embedded applications on a workstation or PC minimizes the development effort and reduces the "time to market".

Rapidly evolving hardware capabilities also requires that the software environment be able to rapidly accommodate modifications to support that hardware, both as variations of common hardware devices, and as entirely new types of hardware, requiring more substantial changes to the underlying software environment's capabilities.

Existing GUI's cannot be scaled small enough to fit within the resource constraints of low-end PDA's and embedded systems. As a result, a need has been created for a GUI adaptable to both low-end, resource-constrained systems, and large-scale, network distributed systems. Existing monolithic GUI designs cannot simultaneously accommodate these requirements. As a result, vendors are forced to create multiple, completely distinct, GUI products to attempt to address the various markets, while their current monolithic product offerings still fail to address the distributed networking needs. This results in duplication of development and maintenance efforts relating to the GUI, as well as to required drivers, and raises compatibility concerns.

It is therefore desirable to create a microkernel GUI with many of the same attributes as a microkernel OS, using the approach of a tiny microkernel that implements only a few primitives. With such an approach, a team of external cooperating processes invoking those microkernel services could be used to construct a windowing system. An important aspect of such a design is to decide what those primitives should be, such that a high-performance, high-functionality, high-flexibility GUI can be built from the GUI microkernel. Inappropriate design decisions in the microkernel could result in a poor-performing system, due to additional overhead incurred from the IPC between the cooperating processes. A microkernel design would have to recover this IPC performance overhead through architectural and design performance advantages accrued from other aspects of the GUI, such as greater concurrency.

A microkernel GUI would have a number of advantages over monolithic kernel GUI's, advantages which equate directly to both better functionality and unique capabilities.

a) Scalability: Simply by including or excluding service-providing processes associated with the microkernel GUI, the functionality (and resource requirements) of the GUI could be scaled to address different application needs ranging from small embedded systems to highend, high-functionality systems. The vendor would only have to create and maintain a single GUI product, rather than a family of products for different environments.

b) Extensibility: As new functionality requirements arise (eg. handwriting recognition, voice recognition, etc.) a microkernel GUI can easily be extended by adding specific service-providing processes. Moreover, these functionality enhancements can be readily accomplished by application developers, rather than requiring (or waiting for) the GUI vendor to implement them. To accommodate additions with a monolithic kernel GUI, the entire GUI would have to be replaced with a new, enhanced version by the GUI vendor. If a developer needs a unique extension, the microkernel approach lets the developer develop those extensions himself, rather than be bound by the original implementation limits.

c) Address protection: With the components of the GUI running in separate, MMU-protected (memory management unit) address spaces, coding errors in one section of the GUI would be contained, and could not cause problems in other sections. Latent bugs in the code would also be likely to "trip" the MMU protection, leading to the early detection of programming errors, rather than have them discovered by end-users of the application. In general, this allows the extensions developed (either by the software vendor or an application developer) to be easily and reliably integrated into the GUI, and results in a more robust GUI.

d) Concurrency: With the GUI running as several concurrent processes, it could demonstrate greater concurrency in it's processing than a single-threaded monolithic kernel GUI. Multiple components of the GUI, since they're implemented as separate processes, can execute concurrently, especially if they're running on different nodes on the network. Although a monolithic GUI could use multiple threads of execution within the monolithic GUI kernel, the complexities of semaphores and mutexes would make it difficult to implement the GUI robustly with the same degree of concurrency. The threaded monolithic kernel also cannot make use of multiple processors except in an SMP (symmetric multiprocessor). The microkernel approach can make use of processors on other network nodes.

e) Network Distribution: If the underlying IPC used by the microkernel GUI was network transparent, all of the components of the GUI could be run on different processors in a distributed system. This would enable a class of distributed GUI capabilities not available using a monolithic GUI. For example, applications could be dragged from one computer's screen onto the screen of a hand-held device connected using a wireless LAN link. This is not possible with a monolithic GUI because the monolithic GUI kernel cannot be broken into separate pieces, each running on a different node on the network.

SUMMARY OF THE INVENTION

It is an object of this invention to provide a system for managing the interaction of programs, comprising means for storing a set of predetermined characteristics respecting each program to be managed, each set of characteristics including an input signal type characteristic indicative of the identity of the type of inputs signals to which the program associated with the set of characteristics is responsive and a signal modification characteristic indicative of whether a type of input signal is to be modified by the associated program; means responsive to input signals having predetermined properties emitted from one of the programs for interrogating each set of predetermined characteristics in a predetermined sequence, determining whether the associated program is responsive to a current input signal, determining whether the properties of the current input signal are to be modified and, if so, modifying the properties of the input signal; and means for emitting an output signal to the programs determined to be responsive to the input signal.

Further features of this invention will be apparent from the following description and appended claims.

BRIEF DESCRIPTION OF THE DRAWINGS

These and other features of the invention will become more apparent from the following description in which reference is made to the appended drawings wherein.

Similar references have been used in different drawings to indicate similar components.

DESCRIPTION OF PREFERRED EMBODIMENT

A microkernel architecture may be used to create a GUI suitable for use in environments covering a wide range of hardware capabilities. To successfully implement a microkernel GUI, it is necessary to employ a microkernel OS having IPC as lean and efficient as possible, since the communicating components of the resulting GUI will be using these IPC services so heavily. The QNX™ (Trademark of QNX Software Systems Ltd.) OS is a suitable microkernel OS for this purpose. Using an OS with low-overhead IPC, it becomes possible to structure a GUI as a graphical "microkernel" process with a team of cooperating processes around it, communicating via that fast IPC.

Running under the microkernel OS, the present invention implements only a few fundamental primitives, from which the higher level functionality of a windowing system is constructed by external, optional processes. Windows do not exist for the present invention itself, nor does the present invention possess the ability to "draw" anything, or manage a pen, mouse or keyboard. Instead, the present invention creates a virtual "Event Space" and confines itself only to managing "Regions" owned by application programs and performing the clipping and steering of various "Events" as they flow through the Regions in this Event Space. This abstraction is parallel to the concept of a microkernel OS not being capable of filesystem or device I/O, instead relying on external processes to provide these higher-level services. As in a microkernel OS, this allows a microkernel GUI to scale in size and functionality by including or excluding services as needed.

The core microkernel abstraction implemented by the present invention is that of an virtual, graphical, three dimensional Event Space that other processes can populate with Regions. These other processes use the native OS IPC to communicate with the present invention, and manipulate their Regions to provide higher-level services usable by other processes, or act as user applications using those services. By removing service-providing processes, the GUI can be scaled down for limited-resource systems. By adding service-providing processes, the GUI can be scaled up to full desktop functionality. The underlying efficiency of the OS IPC and the architecture of the present invention enables the efficiency and performance requirements for low-end embedded and PDA hardware, while also meeting the scalability and flexibility needs for larger desktop and distributed systems.

The present invention uses a number of data structures to represent the entities that populate the Event Space. Data structures for Events and Regions are processed by various algorithms to achieve the required behaviour. This will be further explained below.

The Event Space

Figure 1:
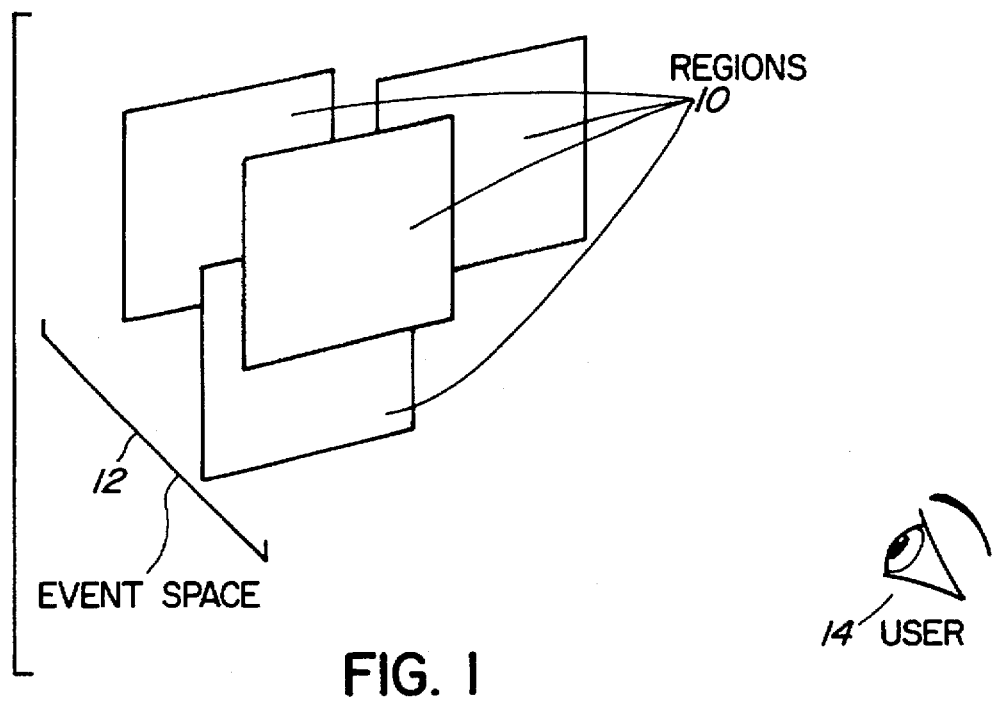
FIG. 1 is a perspective view of the present invention's Event Space illustrating Regions as visualized by a user.

A central characteristic of the present invention is the way in which graphical applications are represented. As indicated in FIG. 1, in the microkernel GUI, all applications exert an influence on the environment through one or more rectangles called Regions (10), which are owned by their respective processes. These Regions reside in an abstract, three-dimensional Event Space (12) where the user (14) can be imagined to be outside of this space, looking in. Regions can emit and collect objects called Events. These Events can travel in either direction through the Event Space (12) (i.e. either toward or away from the user (14)). As Events move through the Event Space (12), they interact with other Regions—this is how applications interact with each other. The process maintaining this simple architecture is the present invention's microkernel.

All the services required for a windowing system, including window managers, device drivers, and applications, can easily be created by using Regions (10) and Events and, because processes whose Regions are managed by the present invention's microkernel need not reside on the same computer as the microkernel, it is also easy to implement network-distributed applications.

Regions and Events

The two basic objects used by microkernel GUI programs are Regions (10) and Events. Regions are stationary, while Events move through the Event Space (12). A Region is a single, fixed rectangular object that a program places in the Event Space (12). A Region possesses attributes that define how it interacts with Events. A Region is described by a data structure containing a number of elements. Each of these elements defines a specific aspect of the Region.

An Event is a set of non-overlapping rectangles that can be emitted and collected by Regions (10), in either direction (towards or away from the user), in the Event Space (12). All Events have a type associated with them. Some types of Events also possess corresponding data.

Events

As an Event flows through the Event Space (12), its rectangle set intersects with Regions (10) placed in the Event Space by other applications. As this occurs, the present invention's microkernel adjusts the Events rectangle set according to the attributes of the Regions with which the Event intersected.

Events come in various classes and have various attributes. An Event is defined by an originating Region, a type, a direction, an attached list of rectangles and optionally, some Event-specific data. Unlike other windowing systems, that only have input events such as pen, mouse, keyboard and expose, both input (pen, mouse, keyboard, expose, etc.) and output (drawing requests) are classified as Events. Events can be generated either from the Regions that programs have placed in the Event Space, or by the present invention itself. Events are used to represent the following:

key presses, keyboard state information mouse button presses and releases pointer motions (with or without mouse button(s) pressed)

Region boundary crossings

Regions exposed or covered drag operations drawing functions

Initial Rectangle Set

Figure 2:
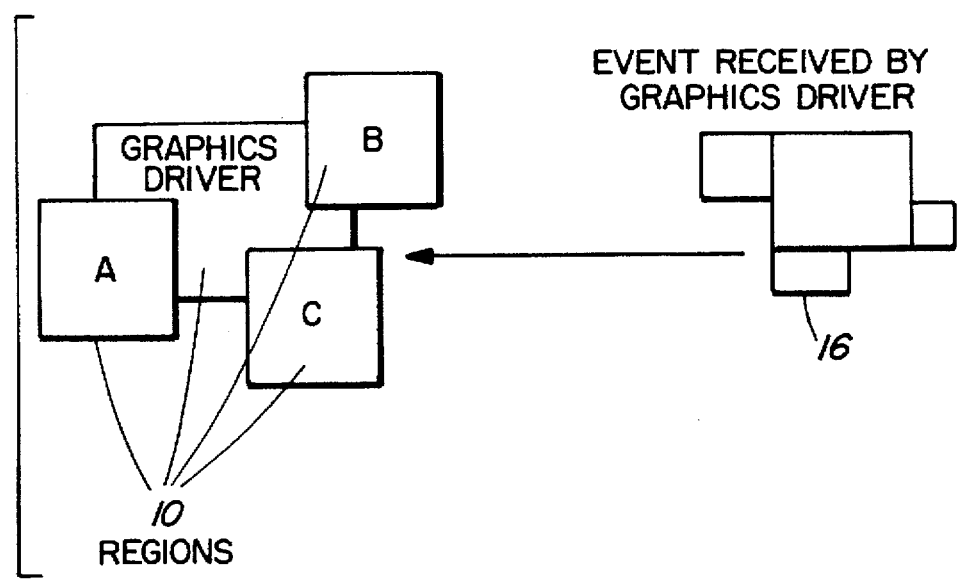
FIG. 2 is a front view of the present invention's Event Space illustrating overlapping Regions and an Event as modified by intersections with Opaque Regions A, B and C.

The initial rectangle set of an emitted Event consists of a single rectangle whose dimensions are usually the size of the emitting Region. As the Event moves through the Event Space, its interactions with other Regions may cause some portions of this rectangle to be removed, as shown in FIG. 2. (16). If this happens, the rectangle will be divided into a set of smaller rectangles (16) that represent the remaining area. Certain types of Events (e.g. mouse button presses) have no need for their initial rectangle set to have the dimensions of the emitting Region. For such Events, the rectangle set consists of a single rectangle whose size is a single point (upper left corner is the same as the lower right corner). A single-point rectangle set is called a Point Source.

Collected Rectangle Set

The rectangle set of a collected Event contains the rectangles that result from the interaction of the Event with prior Regions in the Event Space (16). If an Event is completely occluded by other Regions such that it results in a set containing no rectangles, then that Event ceases to exist.

Regions

A process may create or use any number of Regions (10), placed within the Event Space (12). Furthermore, by controlling the dimensions, attributes and location (relative to the other Regions in the Event Space), a process can use, modify, add, or remove services provided by other Regions.

A Region's owning process and the present invention can be on different, network-connected, computers. A Region has two attributes that control how Events are to be treated when they intersect with a Region and these are known as Sensitivity and Opacity. These can be set independently for each different type of Event.

Sensitivity

If a Region is sensitive to a particular type of Event (Sensitive), then the Region's owner collects a copy of any Event of that type which intersects with the Region. If other Regions are Sensitive to this same Event type and the Event intersects with them, they will also collect a copy of the Event but with a potentially different rectangle set, depending on which other Regions the Event may have interacted with. Although many Regions can collect a copy of the same Event, the rectangle set for the Event may be adjusted, and hence may be unique for each Region that collects the Event. As shown in FIG. 2, the rectangle set reflects the Event's interaction with other Regions in the Event Space before arriving at the collecting Region. If a Region is not Sensitive to an Event type, the Region's owner never collects that type of Event.

The sensitivity attribute neither modifies the rectangle set of an Event nor does it affect the Event's ability to continue flowing through the Event Space.

Opacity

Regions Opaque to a specific Event type block portions of that type of Event's rectangle set from travelling further in the Event Space. The opacity attribute controls whether an Event's rectangle set is adjusted as a result of intersecting with a Region.

If a Region is Opaque to an Event type, any Event of that type which intersects with the Region has its rectangle set adjusted, to clip out the intersecting area. The "clipped out" rectangles are modified in the Event's list of rectangles, such that the list describes only portions of the Event that continue past the Opaque Region. This changes the Event's rectangle set such that it includes more, smaller rectangles. The new rectangles describe the portions of the Event that remain visible to Regions beyond this Region in the Event Space. If a Region is not Opaque to an Event type, then Events of that type never have their rectangle set adjusted as a result of intersecting with that Region. Such a Region is said to be "Transparent" to the Event type.

The best way to illustrate how this clipping is performed is to examine the changes in the rectangle list of a draw Event as it passes through various intersecting Regions. As shown in FIG. 2, when the draw Event (16) is first generated, the rectangle list consists of only a single, simple rectangle describing the Region that the Event originated from.

If the Event goes through a Region (10A) that clips the bottom left corner out of the draw Event, the rectangle list is modified to contain only the two rectangles that would define the area remaining to be drawn.

In a similar manner, every time the draw Event intersects a Region Opaque to draw Events, the rectangle list will be modified to represent what will remain of the draw Event after the Opaque Region has been "clipped out". Ultimately, when the draw Event arrives at a graphics driver's Region ready to be drawn, the rectangle list will precisely define only the portion of the draw Event that is to be rendered (hence, visible).

If the Event is entirely clipped by the intersection of an Opaque Region, the draw Event will cease to exist. This mechanism of "Opaque" windows modifying the rectangle list of a draw Event is how draw Events from an Underlying Region (and its attached process) are properly clipped for display as they Ravel towards the user.

Attribute Summary

The following table summarizes how a Region's attributes affect Events that intersect with that Region:

| If the Region is: | then the Event is: | and the rectangle set is: |
|---|---|---|
| Insensitive, Transparent | ignored | unaffected |
| Insensitive, Opaque | ignored | adjusted |
| Sensitive, Transparent | collected | unaffected |
| Sensitive, Opaque | collected | adjusted |

Insensitive, Opaque: The Event is clipped by the Region as it passes through, but the Region owner is not notified. For example, most applications would use this attribute combination for draw Event clipping, so that an application's window would not be overwritten by draw Events coming from underlying windows.

Sensitive, Transparent: A copy of the Event will be sent to the Region owner, and the Event will continue, unmodified, through the Event Space. A process wishing to log the flow of Events through the Event Space could use this combination.

Sensitive, Opaque: A copy of the Event will be sent to the Region owner, and the Event will also be clipped by the Region as it passes through. By setting this bitmask combination, an application can act as an Event filter or translator. For every Event received, the application can process and regenerate it, arbitrarily transformed in some manner, possibly travelling in a new direction, and perhaps sourced from a new coordinate. In the Event Space.

Event Logging

By placing a Region across the entire Event Space, a process can intercept and modify any Event passing through that Region. If a Region is Sensitive to all Events, but not Opaque, it can transparently log all Events.

Event Transformation

If a Region is Sensitive and Opaque, it can choose to re-emit a modified version of the Event. We refer to this as "transformation". For example, a Region could collect pointer Events, perform handwriting recognition on those Events, and then generate the equivalent keyboard Events.

The Root Region

Figure 4:
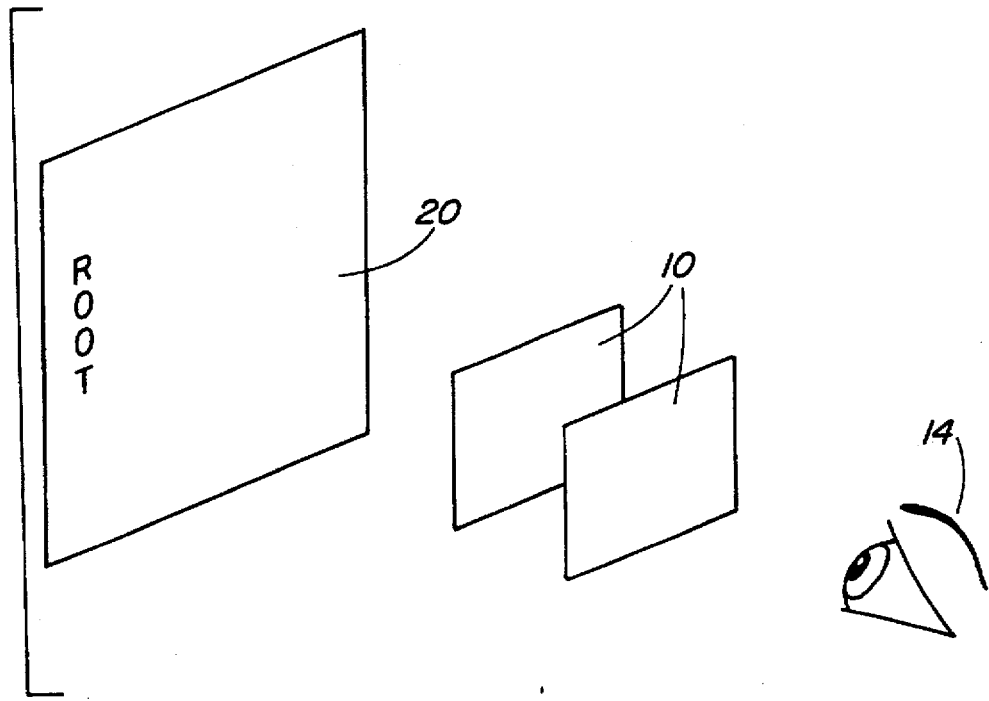
FIG. 4 is a perspective view of the present invention's Event Space illustrating the root Region as viewed by a user.
Figure 5:
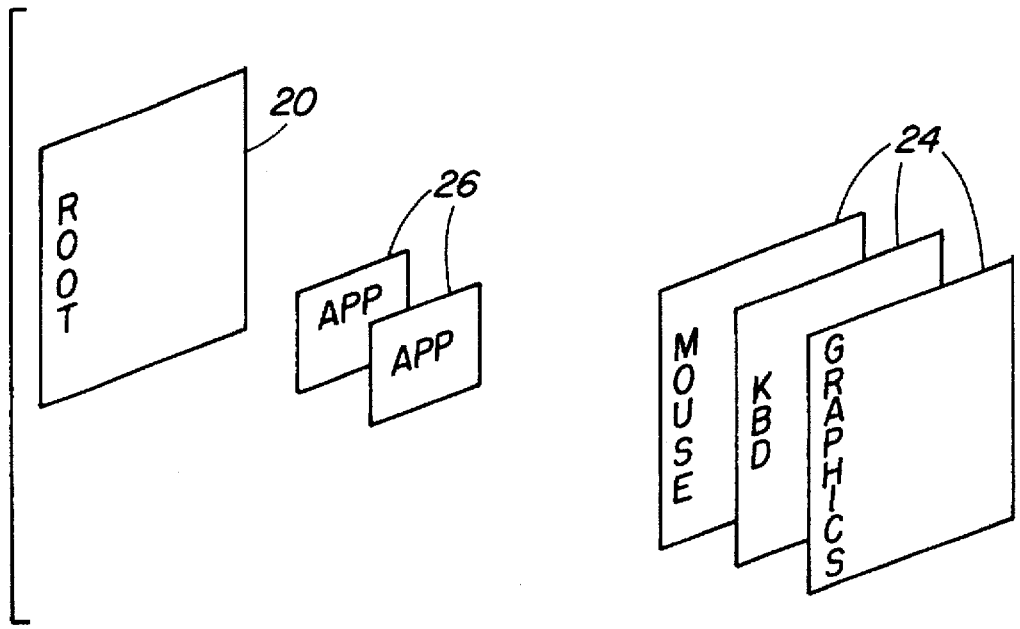
FIG. 5 is a perspective view of the present invention's Event Space illustrating device Regions and application program Regions.
Figure 6:
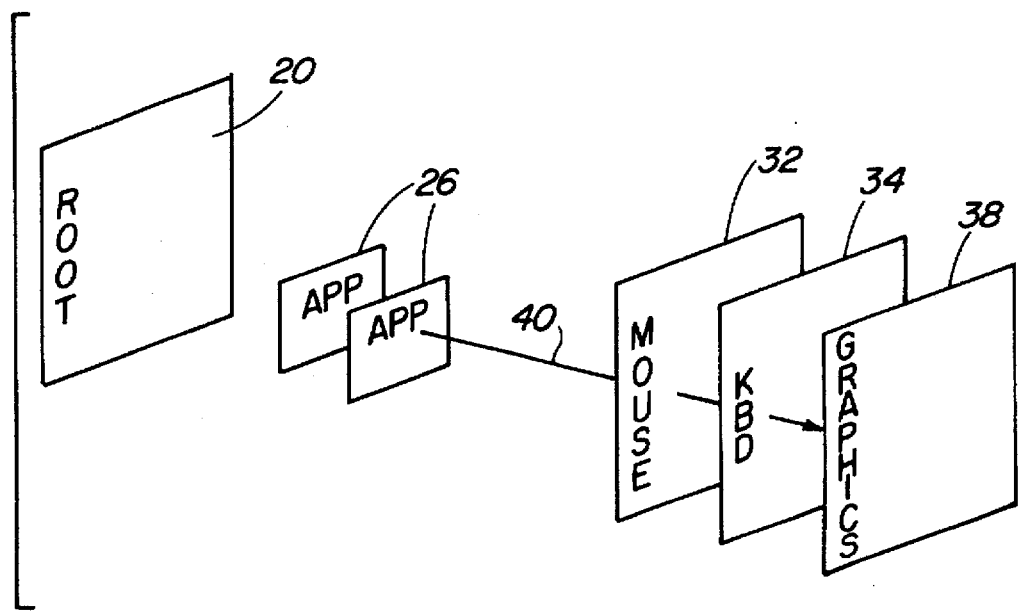
FIG. 6 is a perspective view of the present invention's Event Space illustrating the emission of a draw Event from an application program Region.

A special Region called the root Region (20) is always the Region furthest away from the user (14), as illustrated in FIG. 4. All other Regions descend in some way from the root Region (20). Once an Event travelling away from the user (14) reaches the root Region, it ceases to exist. The dimensions of the root Region are the entire width and height of the present invention's coordinate space. As a result of the Parent/Child relationship of all Regions, the location and position of any Region is ultimately related to the location of the root Region. A Region can be located anywhere in the Event Space and yet have the root Region be its Parent.

Coordinate Space

Figure 3:
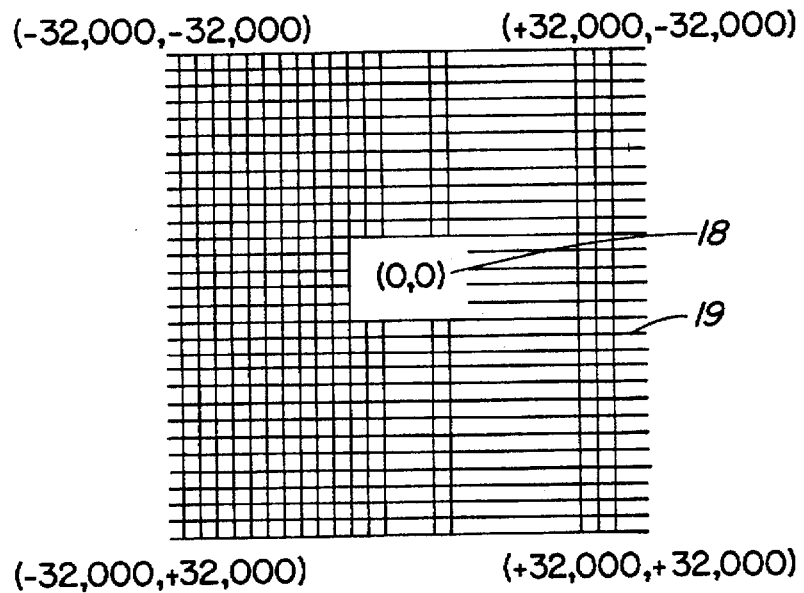
FIG. 3 is a front view of the Event Space illustrating the cartesian layout of the present invention's coordinate space and its dimensions.

All Regions reside within the coordinate space, whose dimensions are as shown in FIG. 3. These dimensions an: range from +32768 to −32767 in the X dimension and to a similar range in the Y dimension. The Z dimension is not numerically bound.

Figure 12:
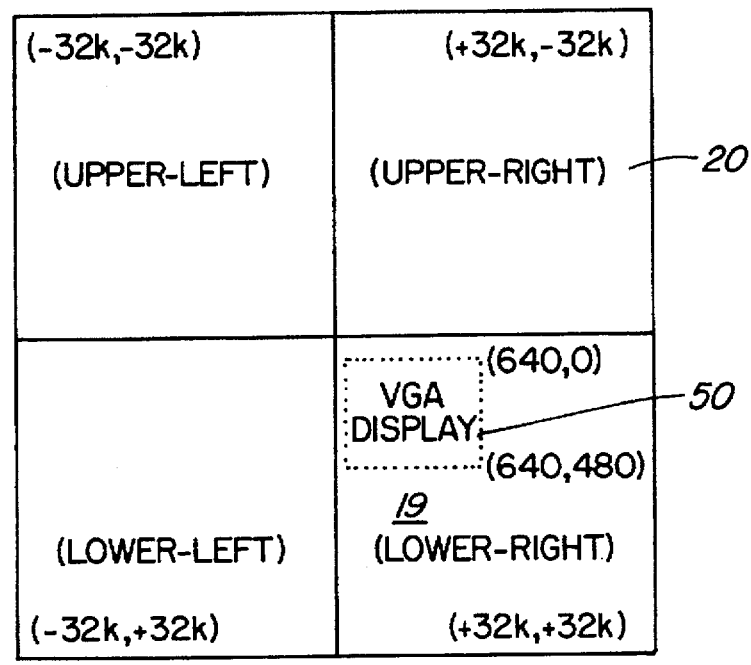
FIG. 12 is a front view of the present invention's Event Space illustrating the cartesian layout of the coordinate space and the positioning of a graphics driver Region.

In contrast to the typical cartesian layout, the lower-right quadrant (19) is the (+,+) quadrant, as illustrated in FIGS. 3 and 12.

The root Region (20) has the same dimensions as the entire coordinate space. As a rule, graphics drivers map the display screen to the location shown in FIG. 12 and place the Region origin at the upper-left corner of the display screen (50). (Graphics drivers equate a single coordinate to a single pixel value on a display screen).

Region Coordinates

When an application specifies coordinates within a given Region, these are relative to the Region's origin. The application specifies this origin when it opens the Region.

The initial dimensions of a Region (i.e. rect argument in PhRegionOpen) are relative to its origin. These dimensions control the range of the coordinates that the application can use within the Region.

Some examples are provided below to show the relationship between a Region's origin and its initial rectangle coordinates. These examples illustrate how opened Regions are placed in relation to the root Region, which has its origin in the center of the coordinate space (see FIG. 3, (18)).

Figure 13:
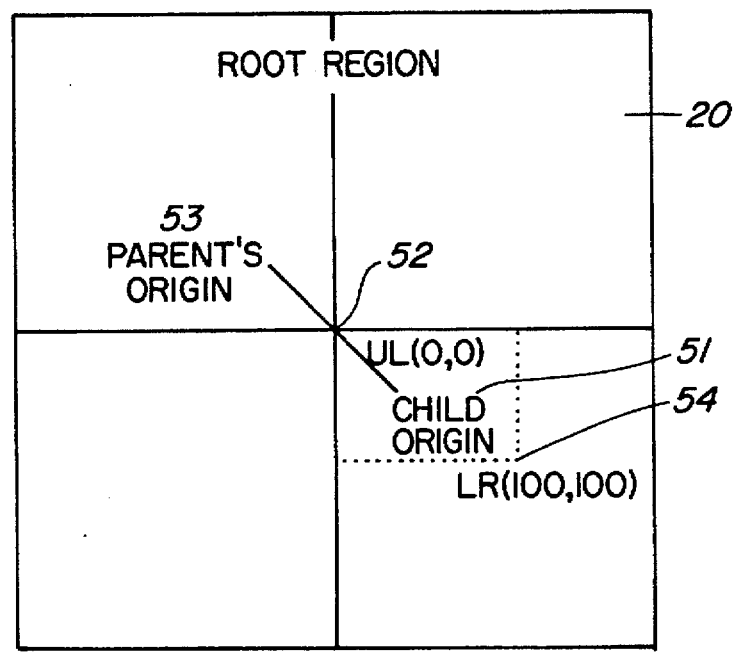
FIG. 13 is a front view of the present invention's Event Space illustrating the relationship between a Region's origin and its initial rectangle coordinates.

As a rule, applications use the following approach for Regions (See FIG. 13)

Coordinates:

Origin (51)=(0,0)

Upper left of initial rectangle (52)=(0,0)

Lower right of initial rectangle (54)=(100,100)

Figure 14:
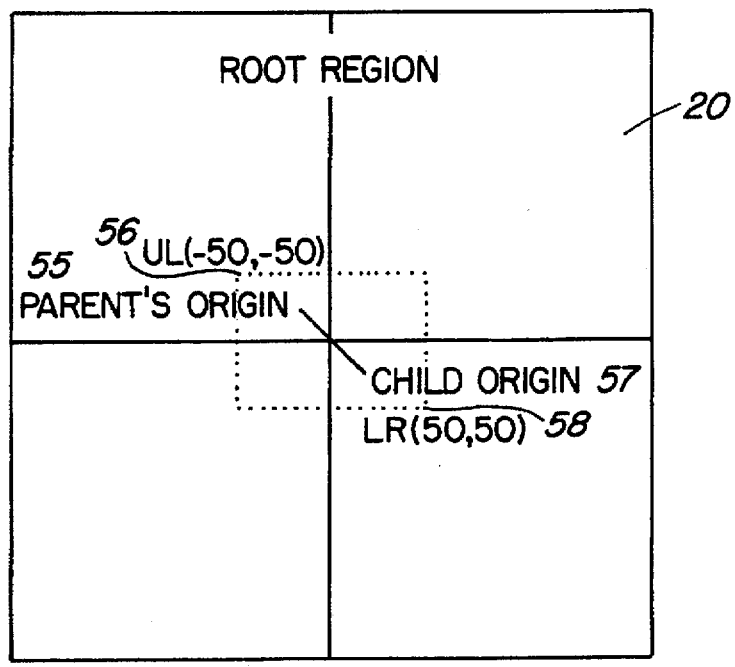
FIG. 14 is a front view of the present invention s Event Space illustrating the relationship between a Region's origin and its initial rectangle coordinates for Regions that fill the entire coordinate space.

The following example is illustrated in FIG. 14 and shows an approach typically used for Regions that fill the entire coordinate space. For example, for the workspace Region, the upper left is (−32000,−32000) and the lower right is (32000,32000).

Coordinates:

Origin (57)=(0,0)

Upper left of initial rectangle (56)=(−50,−50)

Lower fight of initial rectangle (58)=(50,50)

Figure 15:
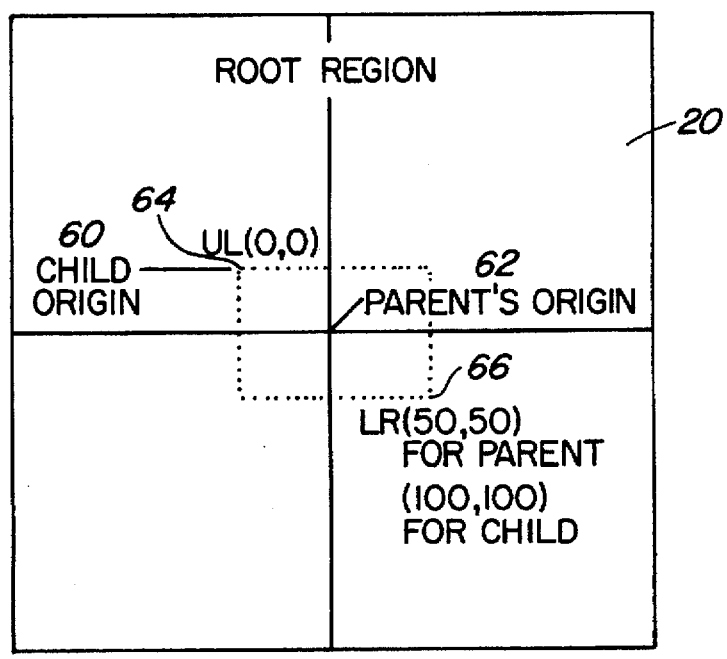
FIG. 15 is a front view of the present invention's Event Space illustrating how a Child Region's origin can differ from its Parent Region's origin.

The following example is illustrated in FIG. 15 and shows how a Child's origin (60) can differ from its Parent's origin (62).

Coordinates:

Origin (60)=(50,−50)]

Upper left of initial rectangle (64)=(0,0)

Lower fight of initial rectangle (66)=(100,100)

Coordinates are always relative to a Region. Thus, when a Region is moved, all its Children automatically move with it. Likewise, when a Region is destroyed, its Children are destroyed.

To become larger than any of its ancestors, a Region must make itself a Child of the root Region using PhRegionOpen() or PhRegionChange(). This action severs the Region's relationship with its former Parent.

Regions and Event Clippings

Figure 16:
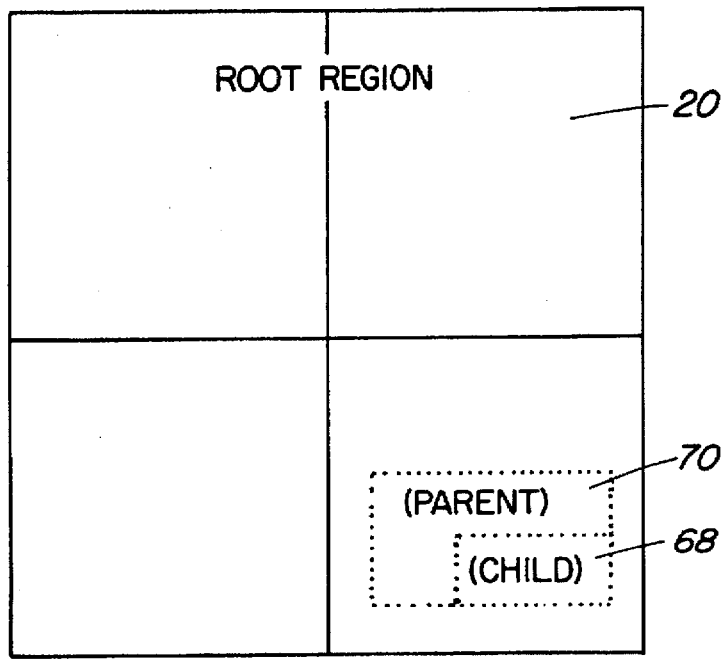
FIG. 16 is a front view of the present invention's Event Space illustrating a Child Region overlapping its Parent's Region.
Figure 17:
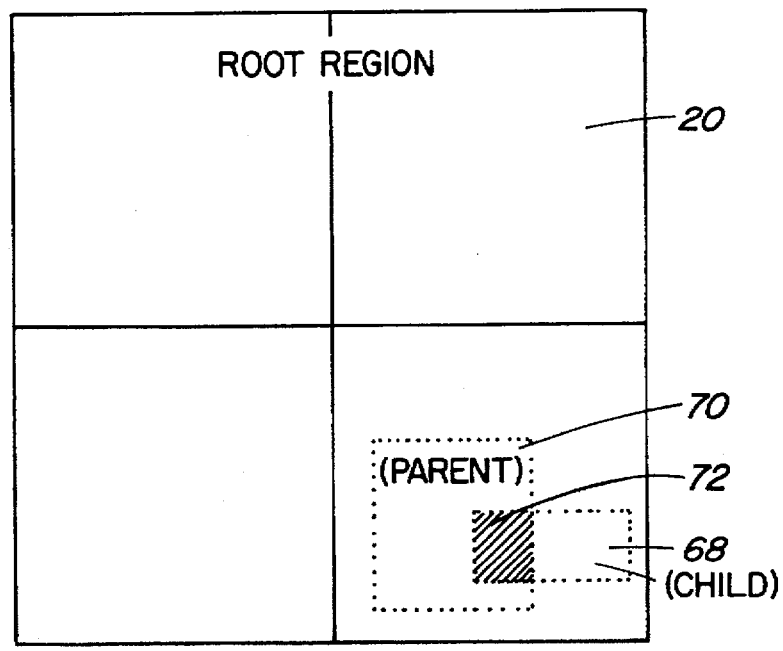
FIG. 17 is a front view of the present invention's Event Space illustrating a portion of a Child Region that does not overlap its Parent Region.

A Region can emit or collect Events only where it overlaps with its Parent. Thus, while Events can be emitted or collected anywhere in the Child Region (68) shown in FIG. 16., the Child Region can emit or collect Events only in the smaller area that overlaps with the patent Region (72), as illustrated in FIG. 17 (in grey).

Because of this characteristic of Regions, any portion of a Region that doesn't overlap its Parent is effectively invisible.

Placement and Hierarchy

Figure 18:
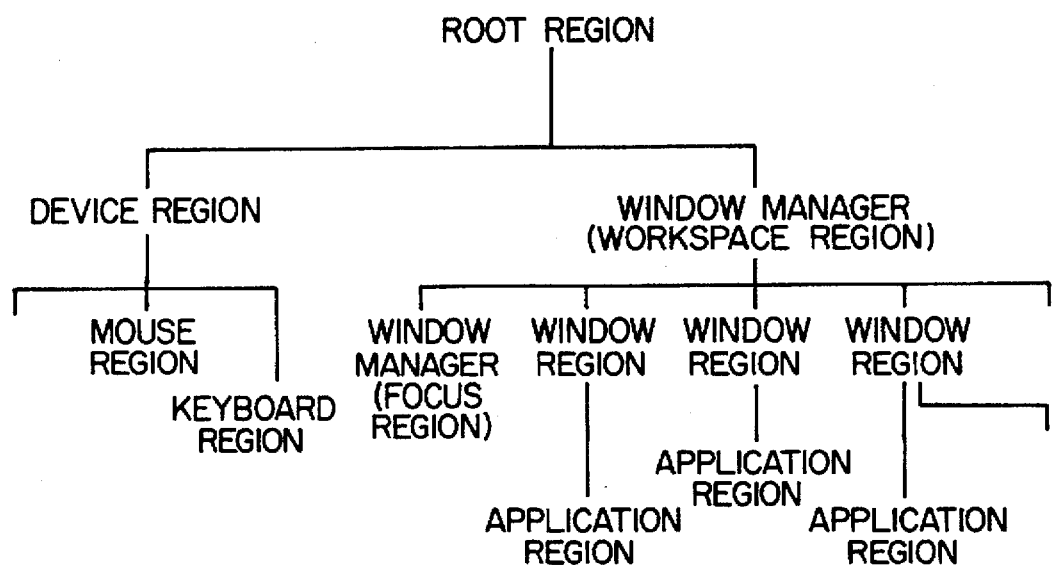
FIG. 18 is a hierarchy chart illustrating the Parent-Child relationship giving rise to a Region hierarchy.

In the present invention, every Region has a Parent Region. This Parent-Child relationship results in a Region hierarchy with the root Region at the top. FIG. 18 shows the hierarchy of a typical system in accordance with the present invention.

Figure 19:
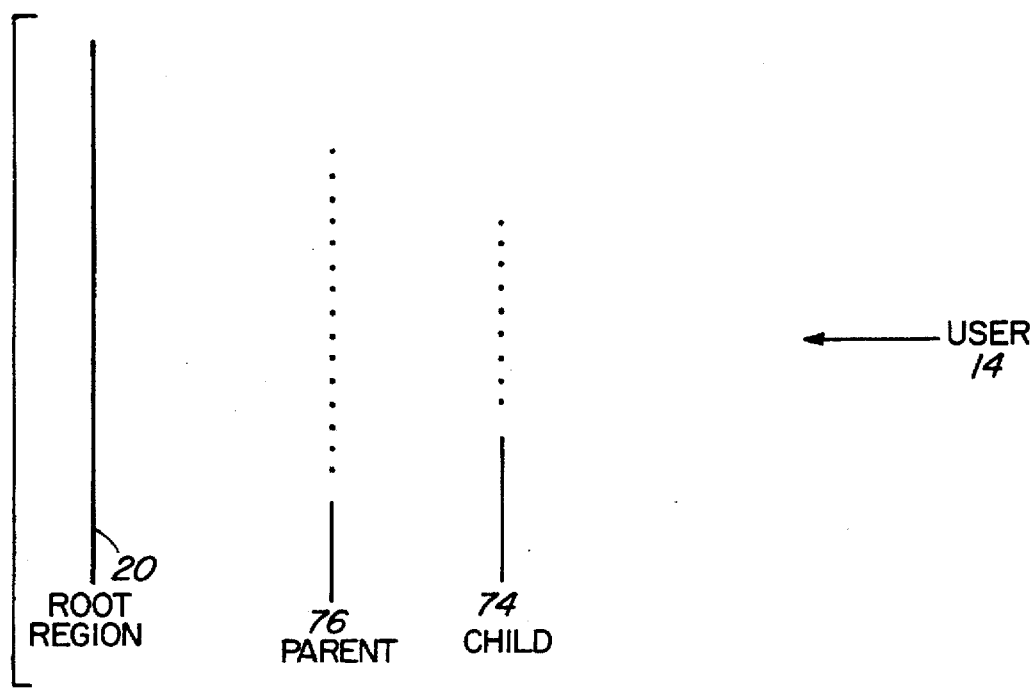
FIG. 19 is a side view of the present invention's Event Space illustrating the relative placement of Parent and Child Regions.

As illustrated in FIG. 19, the present invention's microkernel always places Child Regions (74) in front (i.e. on the user (14) side) of theft Parents (76).

When pinning a Region, an application specifies the Region's Parent. If an application opens a Region without specifying its Parent, the Region's Parent is set to a default—basic Regions become Children of the root Region (20) and windows become Children of the Window Manager's backdrop Region.

Figure 20:
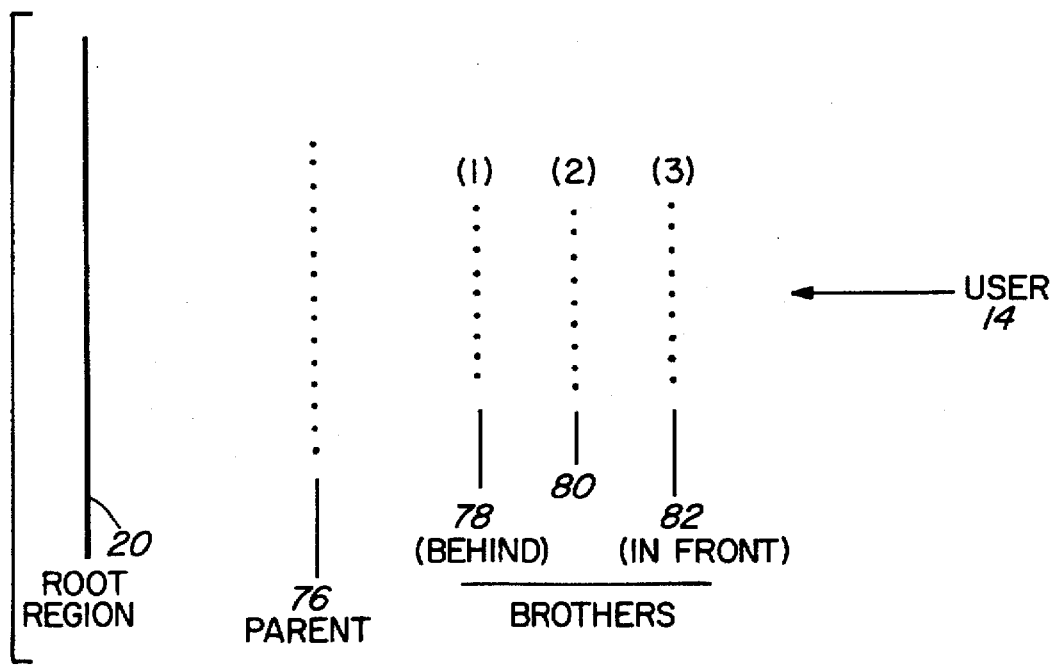
FIG. 20 is a side view of the present invention's Event Space illustrating the relative placement of Brother Regions.

Besides having a Parent, a Region may have Brothers; that is, other Regions who have the same Parent. A Region knows about only two of its Brothers—the one immediately in front and the one immediately behind. FIG. 20 shows a Parent with three Children and the relationship that one of those Children, Region 2 (80), has with its Brothers (78, 82).

When it opens a Region (e.g. Region 2 (80) in FIG. 20), the application can specify neither, one, or both immediate Brothers. Depending on how the application specifies these Brothers, the new Region may be paced according to default rules (see below) or at a specific location.

If an application opens a Region, specifying both Brothers, and this action results in an ambiguous placement request, the resulting placement is undefined.

Figure 21:
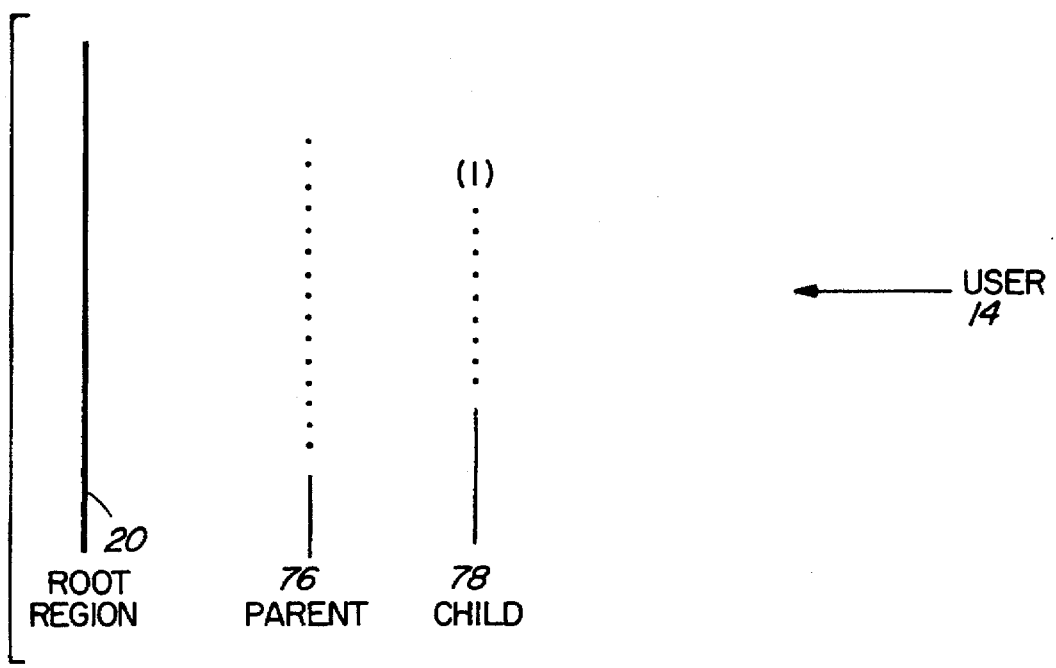
FIG. 21 is a side view of the present invention's Event Space illustrating the relative placement of a Parent Region and a Child Region which has not been flagged to over-ride default placement.

If an application opens a Region without specifying Brothers, the present invention's microkernel places that Region using default placement rules. In most cases, these rules cause a newly opened Region to be placed in front of its frontmost Brother, which then becomes "Brother behind" of the new Region. (To use different placement rules, a programmer can specify the Ph_FORCED_FRONT flag). For example, in FIG. 21, Region 1 (78) is the frontmost Region.

Figure 22:
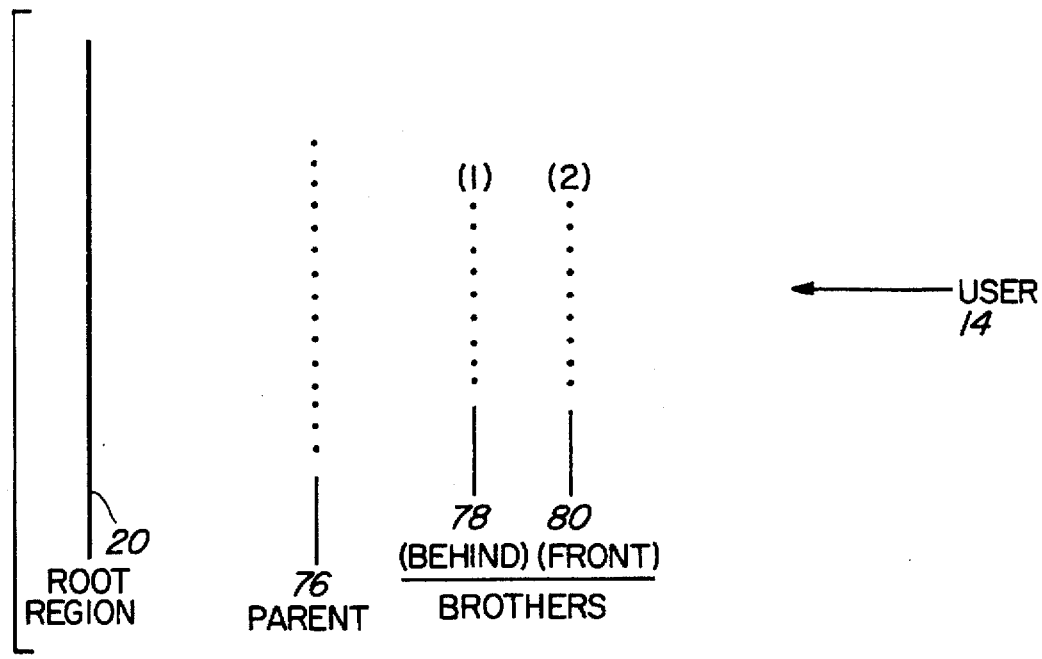
FIG. 22 is a side view of the present invention's Brent Space illustrating the relative placement of Brother Regions where no Brother Region has been flagged to over-ride default placement.

As shown in FIG. 22, when the application opens Region 2 (80) with default placement, Region 2 is placed in front of Region 1 (78). Region 1 becomes Region 2's "Brother behind". Region 2 becomes Region is "Brother in front".

Figure 23:
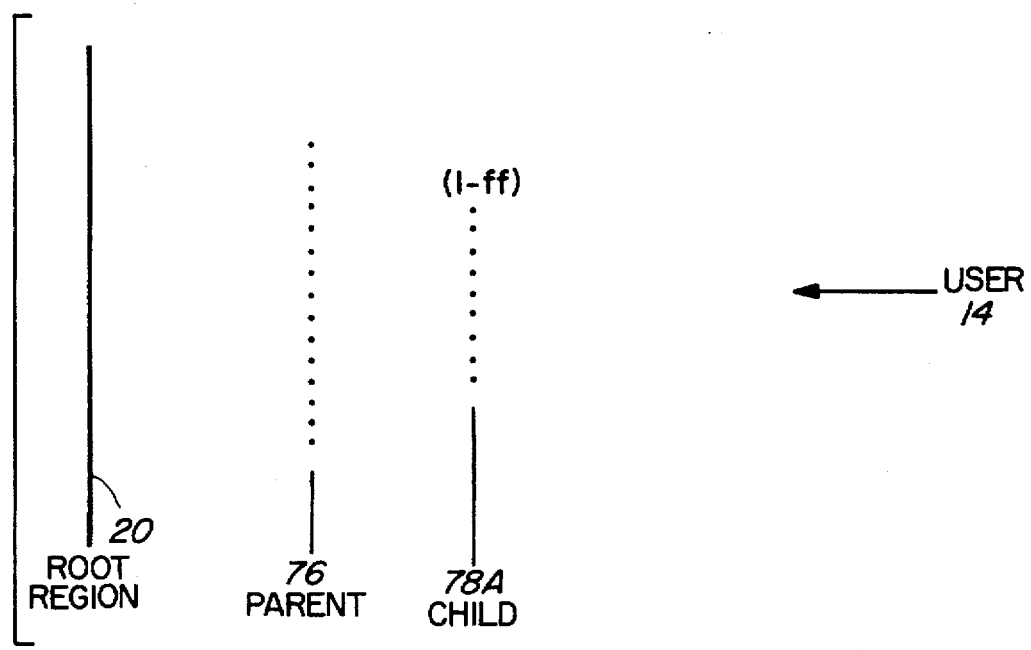
FIG. 23 is side view of the present invention's Event Space illustrating the relative placement of a Parent Region and a Child Region that has been flagged to over-ride default placement.

An application uses the Ph_FORCED_FRONT flag when it wants a Region to remain in front of any subsequent Brothers that rely on the present invention's microkernel's default placement, as shown in FIG. 23 (78A).

Figure 24:
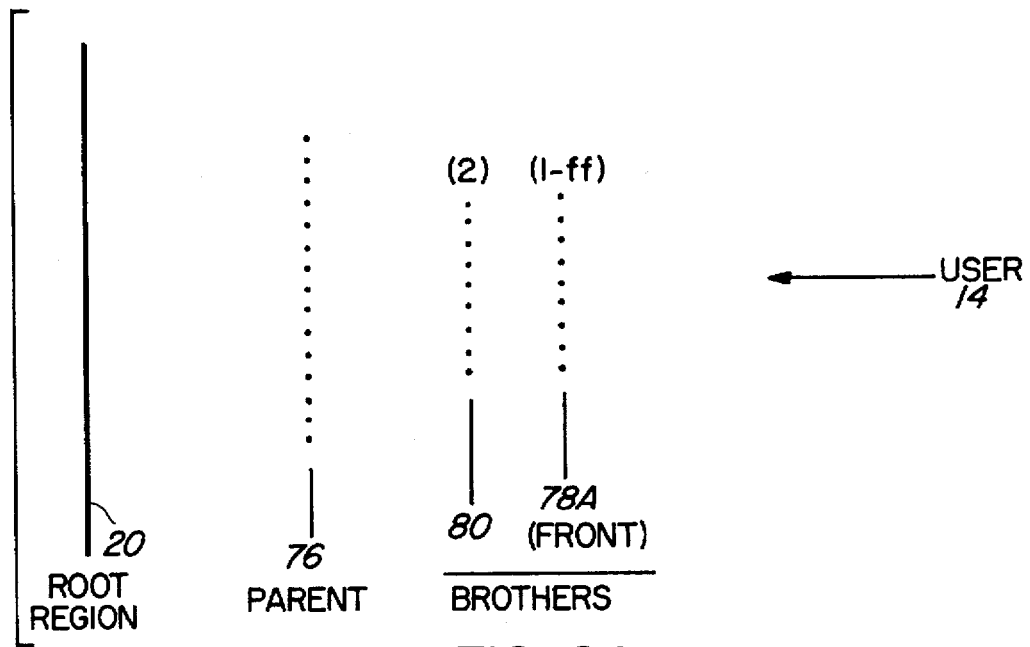
FIG. 24 is a side view of the present invention's Event Space illustrating the relative placement of two Brother Regions where one Brother Region has been flagged to over-ride default placement.

As mentioned above, when a Region is opened with default placement, it's placed ahead of its frontmost Brother. However, if any Brother has the Ph_FORCED_FRONT flag set, then the new Region is placed behind the farthest Brother that has the Ph_FORCED_FRONT flag set. FIG. 24 illustrates what would happen if Region 1 had the Ph_FORCED_FRONT flag set.

When Region 2 is opened with default placement (80), it's placed behind Region 1 (78A), and Region 1 becomes its "Brother in front". Because Region 2 was placed using default rules, it doesn't inherit the Ph_FORCED_FRONT setting of Region 1.

Figure 25:
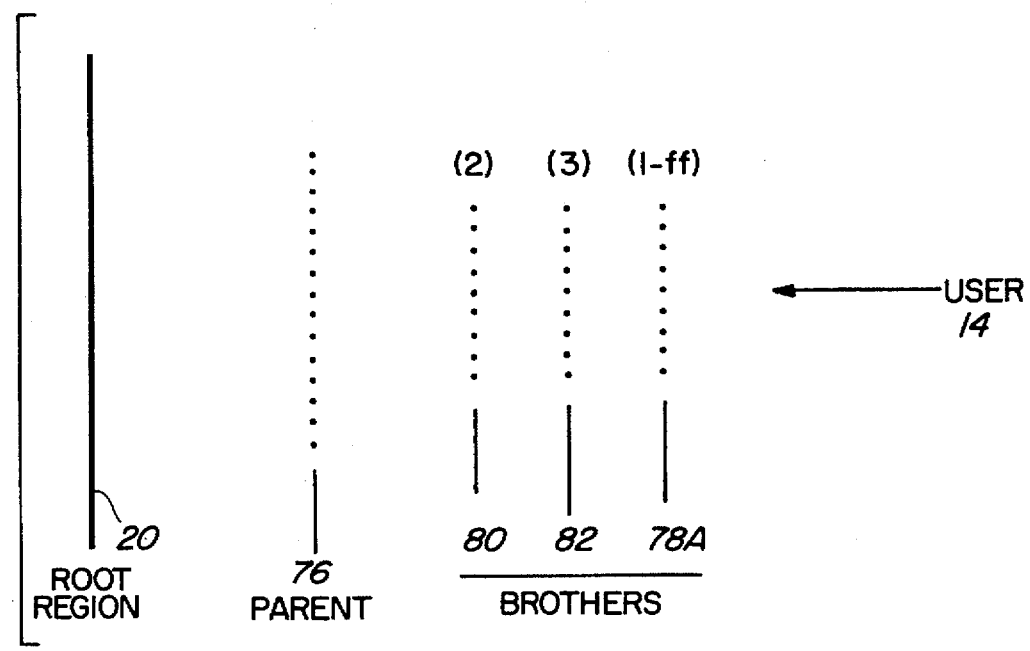
FIG. 25 is a side view of the present invention's Event Space illustrating the relative placement of three Brother Regions where one Brother Region has been flagged to over-ride default placement.

Then, if Region 3 is opened with default placement, it is placed as illustrated in (82) of FIG. 25.

The application can set the Ph_FORCED_FRONT flag when it opens a Region, or later, by changing the Region's flags. The state of this flag doesn't affect how the Region itself is placed, but rather how subsequent Brothers are placed if those Brothers are opened using default placement rules. That is, the Ph_FORCED_FRONT state of existing Brothers doesn't affect the placement of a new Region if it's opened with specified Brother relations.

The Ph_FORCED_FRONT flag only affects placement among Brother Regions—a Child Region always goes in front of its Parent.

In contrast to default placement, if any Brother is specified when a Region is opened, then that specification controls the placement of the new Region. This is known as "specific placement".

If a "behind" Brother is specified, then the newly opened Region automatically is placed in front of that Brother.

If an "in front" Brother is specified, then the newly opened Region is automatically placed behind that Brother.

The Ph_FORCED_FRONT setting of the specified Brother is inherited by the new Region.

If an application opens a Region, specifying both Brothers, and this remits in an ambiguous placement request, then the resulting placement is undefined.

Using Regions

To open a Region, an application passes the information shown in the above diagram to the PhRegionOpen() function:

```
PhRid_t PhRegionOpen ( unsigned fields,
                       PhRegion_t *info,
                       PhRect_t *rect,
                       void *data );
``` where:
- fields When a Region is opened, the present invention's microkernel sets up the Region with default values. If the fields member contains any items, then those items will be set according to their value in the info structure rather than to the default.
- info Indicates the specific settings for the Region.
- rect Indicates the dimensions of the Region (i.e. size and position), relative to the info->origin coordinates, which are in turn relative to the origin of info->Parent. For more information, see ti section on "Region origins".
- data Contains information specific to the Region's type. The data portion of a Region depends on that Region's type (which is specified in info->flags). Programmers should avoid using the data portion of a Region unless intimately familiar with the implementation of that type of Region.

While a Region is always in front of its Parent, the Region's placement relative to its Brothers is flexible. See "Placement and Hierarchy" for more information about "default" and "specific" placement.

The PhRegion_t structure, as explained further below, indicates the relationship of a Region with its siblings: bro_in_from—indicates the sibling immediately in front; bro_behind—indicates the sibling immediately behind. This information can be retrieved using PhRegionQuery().

An application can specify a Region's placement when it opens the Region, or it can change the placement later on. To change a Region's placement, the application must change the relationship between the Region and the Region's family.

The application does this by doing any or all of the following:

1.) setting the Parent, bro_front and bro_behind members of the Ph_Region_t structure;
2.) setting the corresponding fields bits to indicate which members are valid (only those fields marked as valid will be acted on); and
3.) calling the PhRegionChange() function Since an application can be sure of the position of only the Regions it owns, it should not change the position of any other Regions. Otherwise, by the time the application makes a request to change the position of a Region it doesn't own, the information retrieved by PhRegionQuery() may not reflect that Region's current position. That is, a request to change a Region's placement may not have the results the application intended.

A Region's Parent can be changed in two ways. The first and simplest way is to specify the Parent in the Parent member of the PhRegion_t structure. This makes that Region the Parent of the Region specified in the first member of PhRegion_t. However, if the patent is set to 0. Then the Region's Parent is set to a default. For a basic Region, the root Region becomes the Parent. For a window Region, the window manager's backdrop Region becomes the Parent.

The other way to change a Region's Parent is to specify a Child of another Parent as the Region's Brother. This makes the Region a Child of that Parent.

| If you set: | then: |
| --- | --- |
| bro_behind | the Region indicated in the rid member of PhRegion_t moves in front of the bro_behind Region |
| bro_in_front | the Region indicated in the rid member of PhRegion_t moves behind the bro_in_front Region |

As discussed in Changing the Parent, a Region inherits the Parent of an specified Brothers that are Children of another Parent.

Using Events

To emit an Event, an application passes the information shown in the above diagram to the PhEventEmit() function:

| PhEventEmit ( | PhEvent_t * event, PhRect_t * rects, void* data ); |
| --- | --- | where:
event Includes several members, some set by the application emitting the Event, and others by the present invention's microkernel. The application must set the following members:
type Type of Event.
subtype Event subtype (included if necessary).
flags Event modifiers (e.g. direction).
emitter ID of the Region that will emit the Event.
translation Typically set to 0 (see chapter on data structures in Programmer's Reference).
num_rects Indicates the number of rectangles in reels. If the application sets num_rects to 0, it must also set reels NULL.
The present invention's microkernel sets the following members:

timestamp The time when this Event was emitted (in seconds).
collector ID of the collecting Region.
rects An array of rectangles indicating the Event's initial rectangle set. If the application sets rects to NULL, the initial rectangle set defaults to a single rectangle that has the dimensions of the emitting Region (i.e. event->emitter).
data Valid data for the type of Event being emitted. Each type has its own type of data. See the section on "Event Types".

Sometimes an application needs to target an Event directly at a specific Region without making the Event travel through the Event space before arriving at that Region. To ensure that the targeted Region sees the Event, the application must:

1.) set the emitter member of the PhEvent_t structure to the ID of the target Region-this causes the Event to be emitted automatically from that Region; and
2.) set Ph_EVENT_INCLUSIVE on the event—this causes the present invention's microkernel to emit the Event to the emitting Region before emitting it into the Event space.

If a targeted Event is not to continue through the Event space, the emitting Region must be made opaque to that type of Event.

When an Event is emitted, the coordinates of its rectangle set are relative to the origin of the emitting Region. But when the Event is collected, its coordinates become relative to the origin of the collecting Region. The present invention's microkernel ensures this happens by translating coordinates accordingly.

To collect Events, applications call PhEventRead() or PhEventNext(). The PhGetRects() function extracts the rectangle set and PhGetData() extracts the data portion of the Event.

A Region can collect Events only if portions of its Region overlap with the emitting Region.

Event Compression

The present invention's microkernel compresses drag, boundary, and pointer Events. That is, if one of these types of Events is pending when another arrives, the new one will overwrite it. As a result, an application sees only the latest values for these Events and is saved from collecting too many unnecessary Events.

How Region Owners are Notified of Events

Region owners can be notified of Events by the present invention in three different ways: they can either poll, use synchronous notification, or asynchronous notification. To poll, the application calls a function that asks the present invention to reply immediately with either an Event or a status indicating no Event is available. Although polling should be avoided in multitasking systems, it may be beneficial on occasion. For example, an application rapidly animating a screen can poll for Events as part of its stream of draw Events. An application can also use polling to retrieve an Event after an asynchronous Event notification (see below).

For synchronous notification, the application calls a function that asks the present invention to reply immediately if an Event is pending, or if none is available, to wait until one becomes available before replying. With synchronous notification, an application cannot block on other sources while it is waiting for the present invention to reply. This behaviour should be acceptable in most cases since it causes the application to execute only when the desired Events become available. If for some reason the possibility of blocking on the present invention is not acceptable, asynchronous notification may be considered.

For asynchronous notification, the application calls a function that sets up a notification method (i.e. a signal or a proxy) that the present invention activates when an Event of the desired type is available. The application can then retrieve the Event by polling. With asynchronous notification, an application can block on multiple sources, including processes that aren't applications within the GUI.

Input Manager

The present invention's Input Manager (Photon.input) is a process which places a Region near the front of the Event Space, just behind the graphics drivers. It collects data from input devices such as the keyboard, mouse and pen. As input from these hardware devices occurs, Photon.input injects the corresponding Events into the Event Space. For pointing device input (pen and mouse), as the pen and mouse Events are injected into the Event Space, Photon.input also emits draw Events for a mouse or pen cursor out towards the user, where they will intersect a graphics driver Region, resulting in a mouse or pen cursor becoming visible on the screen as the corresponding input device is moved.

Device Drivers

In the present invention, device drivers aren't inherently different from other applications. They're simply programs that use Regions and Events in a particular way to provide their services. As with a microkernel OS, this allows device drivers to be easily started and stopped at runtime, and to be developed with the same tools (and ease of development) as application programs.

Figure 8:
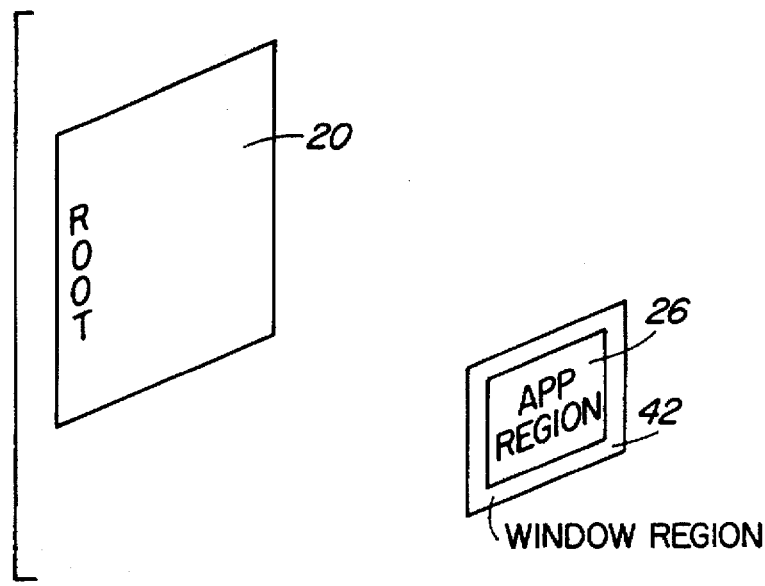
FIG. 8 is a perspective view of the present invention's Event Space illustrating the window Region in relation to the application program and root Regions.
Figure 9:
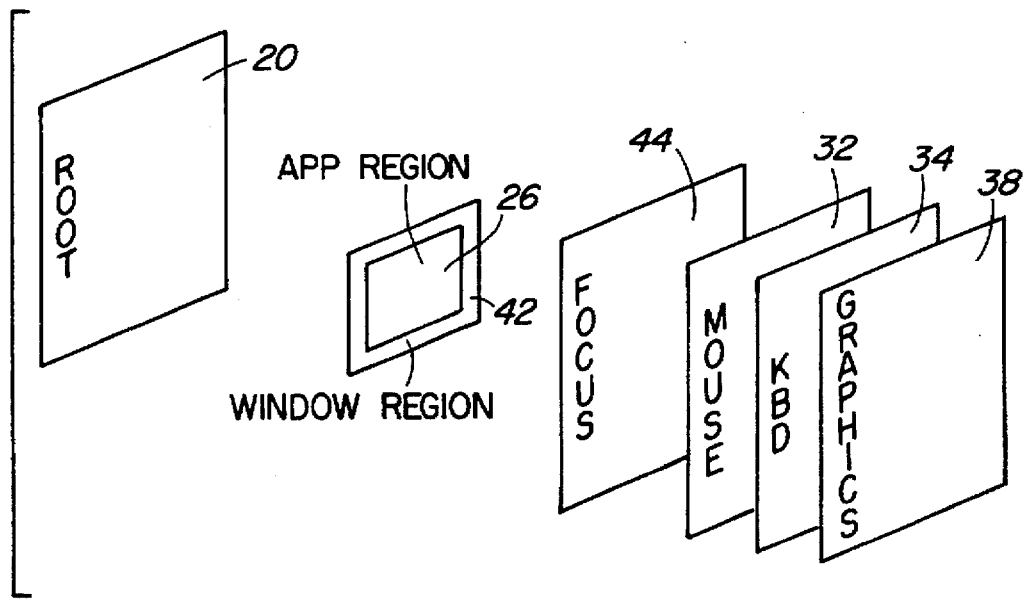
FIG. 9 is a perspective view of the present invention's Event Space illustrating the window and focus Regions in relation to the root Region.

Depending on its function, a driver is either an "input driver" or an "output driver". For example, the mouse and keyboard drivers tend to be classified as input drivers since they emit, and are the source of, hardware actions. As illustrated in FIG. 8, graphics (38) and printer drivers, on the other hand, tend to classified as output drivers since they collect Events (40) that cause them to take action with hardware devices.

Input Events

No assumption is made by the present invention as to what a pointing device or keyboard is. The process injecting mouse, pen or keyboard Events could interface to any arbitrary hardware or process, and collect data which it transforms into the corresponding input Events.

Many keyboard-less graphical applications have the need to "pop-up" a visual keyboard that the user can operate by "tapping" time displayed keys. By creating this keyboard as a Region that accepted mouse and pen Events, and transforms those Events into key Events "injected" into the Event Space, any application could use this keypad without explicit programming effort. In a similar manner, an application that reads A/D data representing speech from a /dev/audio resource manager could perform voice recognition on the data and inject the equivalent keystrokes into the system, all without application modifications.

Graphics Driver

A graphics driver places a Region (38) Sensitive to draw Events (40) into the Event Space. As the driver collects draw Events, it renders the graphical information on the screen. Because the collected Event's rectangle set contains only those areas that need to be updated, the driver can optimize its update. This is especially efficient if the graphics hardware can handle clipping lists directly. The present invention's drawing API accumulates draw requests into batches that are emitted as single draw Events. The job of e graphics driver is to transform this clipped draw list into a visual representation on-whatever graphics hardware the driver is controlling.

An advantage to delivering a "clip list" within the Event passed to the driver is that each draw request then represents a significant "batch" of work. As graphics hardware advances, more and more of this "batch" of work can be pushed directly into the graphics hardware. Many display controller chips already handle a single clip rectangle; graphics hardware at handles multiple clip rectangles is imminent.

Multiple Graphic Drivers

Figure 7:
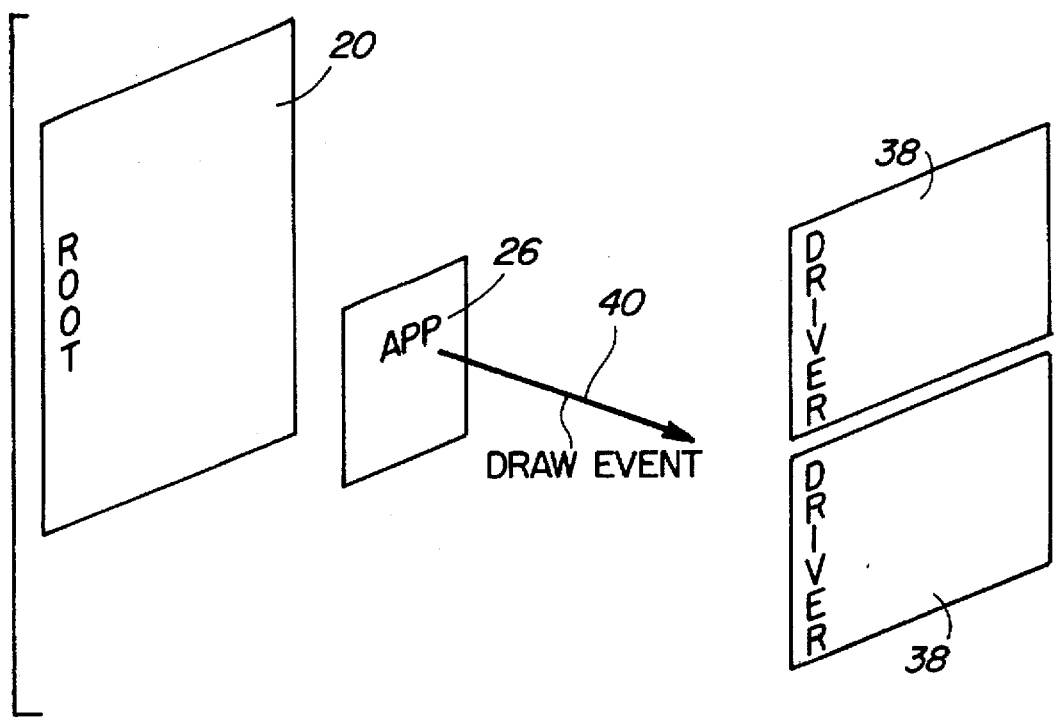
FIG. 7 is a perspective view of the present invention's Event Space illustrating the use of multiple graphics drivers.

From an application's perspective, the coordinate space always looks like a single, unified graphical space, yet it allows users to drag windows from one physical screen to another. Since graphics drivers simply put a Region into the Event Space, and that Region describes an X by Y space to be intersected by draw Events, it naturally follows that multiple graphics drivers can be started, each controlling a different graphics controller card, with their draw-Sensitive Regions present in the same Event Space. These multiple Regions could be placed physically adjacent to each other, as shown in FIG. 7 describing an array of "drawable" tiles (38). or overlapping in various ways. With a suitable underlying OS, such as QNX™, providing network transparency, applications or drivers can run on any node, allowing additional graphics drivers to extend the graphical space of the present invention to the physical displays of many networked computers. By having the graphics driver Regions overlap, the draw Events can be replicated onto multiple display screens.

Many interesting applications become possible with this capability. One is that an operator in a factory could walk up to a desk top computer with a wireless-LAN PDA in their hand, drag a window from a plant control screen onto the PDA, and walk out onto the plant floor, able to interact with the control system to monitor and adjust the plant-floor equipment they may be inspecting. This also enables useful collaborative modes of work for people using multiple PDA's, such that a group of people can simultaneously see the same application screen on their PDA's, and cooperatively operate the application. This approach is ideally suited for support or training environments.

From the application's perspective, this looks like a single, unified graphical space. From the user's perspective, this allows windows to be dragged from physical screen to physical screen, even across the network links.

Remote Screen Viewing

Another useful facility is the ability to view a remote graphical desktop and manipulate it as if it was local. This is known as "Ditto" and is useful for remote diagnostics, technical support/training, collaborative team work, and many other situations. A problem with implementing such an application for graphical environments is that graphical screens contain potentially megabytes of pixel data, requiring a large bandwidth to relay the screen image, as well as large amount of processor and memory overhead to compare previous screen images with current screen images in an attempt to send only differences, minimizing the bandwidth requirement. Typically, hardware constrained platforms, such as PDAs and embedded systems, lack the processor, memory and communications bandwidth to support a pixel-copying Ditto effectively. Using the present invention and a suitable underlying OS, this is easily done.

A Ditto is implemented as a Transparent, draw-Event-Sensitive Region placed in front of the entire screen (or a single application Region). As draw Events come out of the Event Space and transparently pass through the ditto Region, a copy of the draw Events would be received by the Ditto process. This Ditto process would also own a Region in another the present invention Event Space, on another node in the network. In that Event Space, the draw Event would be regenerated; travelling out towards a graphics driver where the same draw list as on the first system would be processed and drawn. In a similar manner, keyboard, pen and mouse Events entering the Ditto Region in the second Event Space could be relayed across and regenerated in the Event Space being monitored. The advantage of this approach is that draw Events require a much lower bandwidth than pixel copying and comparing. The Ditto is functional across low-bandwidth links even though its core functionality can be expressed in less than 160 lines of C, or less than 1 Kbyte of code.

Primer Driver

To print an area of the coordinate space, the printer driver inserts a Region that is Opaque to draw Events in front of tie area of the coordinate space to be printed. This prevents draw Events from reaching the graphics driver. The printer driver then emits an expose Event toward the Region being printed, waits to collect draw Events from that Region, and renders them on the printer. Once the draw Events are completed, the Region is removed, without having caused a visible redraw on the screen.

This scheme permits printing of any Region, even if the Region is blocked by others in the Event Space. Also, the printer driver could emit its own draw Events toward the user to indicate a printing operation is in progress.

Since the printer driver collects draw Events, it can translate them into the format necessary for different types of print devices. For example, when using a PostScript printer, draw Events could be translated directly into commands that take full advantage of the printer's resolution. Since the draw Events being translated are high-level draw requests, they can be rendered on the print device at full printer-resolution, rather than with the coarse pixelation that results from a green-resolution "pixel dump".

Encapsulation Drivers

Since graphics drivers are really just applications to the present invention, they can be applications displaying their graphical output inside another windowing system. A driver could also take the keyboard and mouse Events it collects from the other windowing system and regenerate them within the Event Space, allowing the window in the other system to be fully functional, both for graphical display and for keyboard/mouse input,

Window Manager

The window manager is an optional application that manages other Regions. It provides the windowing system with a certain look and feel.

The window manager also manages the workspace, supplements the methods for focusing keyboard Events, and displays a backdrop. To provide all these services, the window manager places several Regions in the Event Space, namely:

window Regions;

a focus Region;

a workspace Region; and a backdrop Region.

Colour Model

Colours processed by the graphics driver applications are defined by a 24 bit RGB (red-green-blue) quantity, 8 bits for each of red, green, total range of 16,777,216 colours. Depending on the actual display hardware managed by the graphics driver applications, the driver will either invoke the 24-bit colour directly from the underlying hardware, or use various dithering techniques to create the requested colour from less-capable hardware. Since the graphics drivers use a hardware-independent colour representation, application can be displayed without modifications on hardware possessing varied colour models. This allows applications to be "dragged" from screen to screen without concern for what the underlying display hardware's colour model might be.

Window Regions

Most applications rely on the windowing system to provide the user with the means to manipulate their on-screen size, position, and state (i.e. open/configured). So the user can perform these actions, the window manager puts a frame around the application's Region and then places gadgets in that frame (e.g. resize corners, title bars, buttons). These gadget services are referred to as "window services". To indicate it can provide window services, the window manger registers with the present invention. As shown in FIGS. 8–11, when an application opens a window, the window manager sets up two Regions on its behalf: namely a window Region (42) and an application Region (26). The window Region is slightly larger than the application Region and is placed just behind it.

The application uses the application Region (26) while the window manager uses the window Region (42) for its gadgets. The application isn't aware of the window Region or the gadgets drawn on it. If the user uses the gadgets to move the application, the application notices only that its location has changed. The same goes for resizing, iconifying, and so on.

Focus Region

By placing a Region of its own (the focus Region (44)) into the Event Space, the window manager can intercept these keyboard Events as they are emitted from Photon.input's Region and implements an input focus method.

The window manager can redirect keyboard Events to Regions not directly beneath the screen pointer. For example, it can focus Events toward the last window the user "clicked" on (i.e. The active window). The window manager can direct keyboard Events to that active Region even if the Region gets covered by another Region.

Workspace Region

Figure 10:
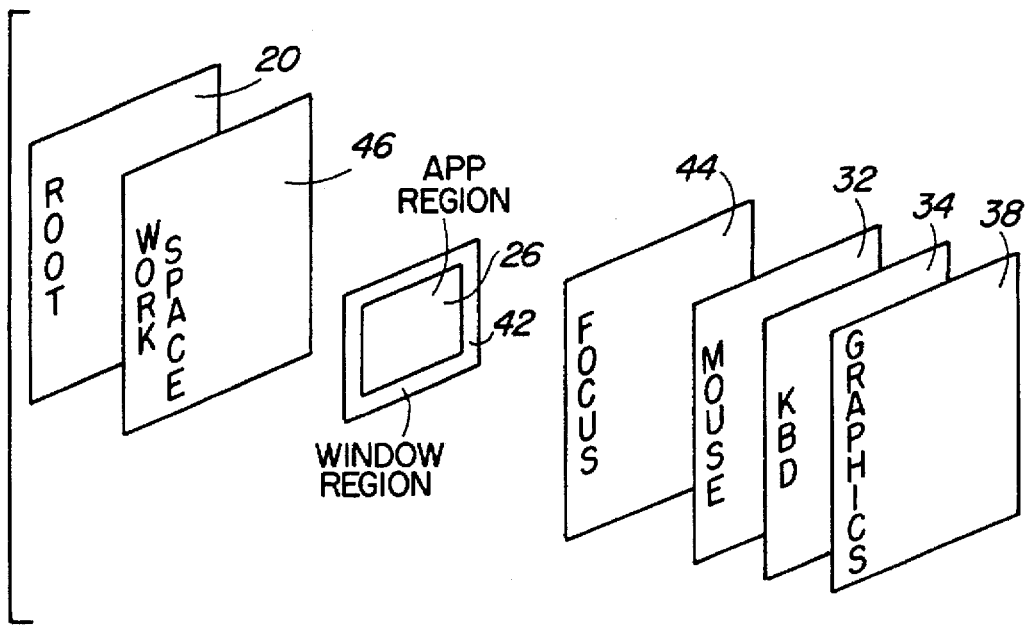
FIG. 10 is a perspective view of the present invention's Event Space illustrating the workspace Region in relation to the root and window Regions.
Figure 11:
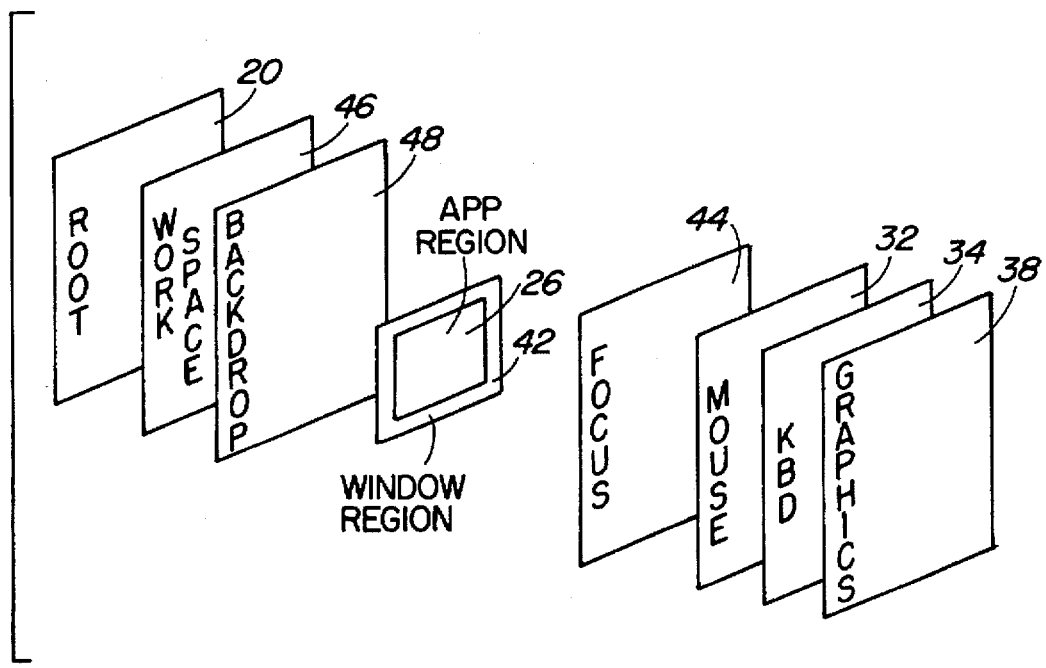
FIG. 11 is a perspective view of the present invention's Event Space illustrating the backdrop Region in relation to the workspace and window Regions.

From the user's perspective, the workspace is the empty space surrounding the windows on the screen. As shown in FIGS. 10–11, the window manager places a workspace Region just in front of the root Region to capture pointer Events before they get to the root Region and thus disappear. When the user presses a pointer button and no other Region collects the Event, the window manager brings up a workspace menu that lets the user select a program to run.

Backdrop Region

Users often like to have an ornamental backdrop image displayed behind the windows on the screen. To display such a bitmap, the window manager places a backdrop Region (48) in the Event Space as illustrated in FIG. 11.

Responsibilities of Microkernel

The present invention's microkernel performs a small set of operations from which the processes that surround the microkernel can construct a windowing system. Those functions are:

1.) Maintaining a Region hierarchy as a set of data structures within the present invention's microkernel. The actions associated with maintaining the Region hierarchy are:
   a) Opening Regions
   b) Changing the characteristics of Regions
   c) Closing Regions
      These actions are described in more detail in a following section.
2.) Emitting Events. Emitting an Event entails accepting the emit request from a process which owns a Region in the Event Space and then traversing the linked list of data structures that describes the Regions in the Event Space in the direction indicated in the Event (to front, or to back) and examining each. Region to test for an intersection, and if so, to apply the actions indicated by the sensitivity and opacity bits within the intersected Region.
3.) Maintaining an Event queue for each client. The actions associated with this maintenance include:
   a) Enqueuing Events for the processes which own Regions.
   b) Dequeuing Events to the processes which own Regions.
   c) Client-controlled throttling to prevent queue overflows.
4.) Responding to queries. Processes which own Regions have the ability to make miscellaneous queries of the present invention's microkernel including:
   a) Querying about a Region or a Region type
   b) Querying about a client process
   c) General statistics Data Types:

The present invention's API uses the following data structures:

PhPoint_t the coordinates of a single point
PhRect_t the coordinates of a rectangle
PhArea_t the position and dimensions of a rectangular area
PhEventRegion_t the emitter and the collector of an Event
PhEvent_t an Event
PhRegion_t a Region 1.) PhPoint_t Structure
The PhPoint_t structure describes the coordinate of a single point. It contains at least the following members:
short x; x-axis coordinate
short y; y-axis coordinate 2.) PhRect_t Structure
The PhRect_t structure describes the coordinates of a rectangle. It contains at least the following members:
PhPoint_t ul; upper-left corner
PhPoint_t lr; lower-right corner 3.) PhArea_t Structure
The PhArea_t structure describes the position and dimensions of a rectangular area. This structure contains at least the following members:
PhPoint_t pos; upper-left corner of the area
PhPoint_t size; x value specifies width of the area and y value specifies height of the area 4.) PhEventRegion_t Structure
The PhEventRegion_t structure describes the emitter and the collector of Events (see PhEvent_t). It contains at least the following members:
PhRid_t rid; The ID of a Region. This lets an application determine which of its Regions emitted or collected an Event.

long handle; The user-definable handle that the application specifies when it opens the Region. Applications can use handle m quickly pass a small mount of information along with Events.

If the Region described by a PhEventRegion_t structure isn't owned by the application that collected the Event, then the present invention's microkernel sets handle to 0.

5.) PhEvent_t Structure
The PhEvent_t structure describes an Event. It contains at least the following members:

unsigned long type; Contains the Event type, thus indicating how to interpret the data associated with the Event. Setting more than one type for an Event is invalid. For the possible values of type, see the section on Event Types.

unsigned short subtype; Contains further information about the Event.

PhEventRegion_t emitter; Specifies which Region will emit the Event. An application can emit an Event from a Region it doesn't own by setting emitter to the ID of that Region. Applications can use this approach when they target the device Region by setting the Ph_EVENT_INCLUSIVE flag.

PhEventRegion_t collector; Indicates which Region collected the Event. When a process has many Regions open, collector lets the process distinguish which of its Regions was involved.

unsigned short flag; Contains event-modifier flags. At least the following flags are defined. A programmer can OR the following values into flags:

Flag
Effect

Ph_EMIT_TOWARD Emits the Event toward the user. By default, Events are emitted away from the user.

Ph_EVENT_ABSOLUTE Forces the rectangle set associated with the Event to be relative to the root Region's origin. By default, the coordinates of the rectangle set are relative to the origin of the emitting Region.

Ph_EVENT_INCLUSIVE Forces the present invention's microkernel to emit the Event first to the emitting Region, and then through the Event Space. Using this, an application can guarantee that the emitter will see the Event (assuming the emitting Region is Sensitive to that event type). time_t timestamp;. Indicates when the Event was emitted. Specified in seconds.

PhPoint_t translation; The translation between the emitting Region's origin and the collecting Region's origin. An application uses this member to convert coordinates that are relative the emitter's Region to coordinates that are relative to collector's Region. For example, let's say the graphics driver wishes to render Ph_EV_DRAW Events. When these Events reach the driver, they contain coordinates relative to the Region that emitted them. To render these Events within its own Region, the graphics driver uses translation to convert the coordinates.

unsigned short num_rects; Indicates the number of rectangles associated with the Event.

unsigned short data_len; Indicates the length of the data associated with the Event. Since Event data is optional, a programmer can set data_len to 0. To extract the data from an Event, see PhGetData( ).

5.) PhEvent_t Structure: Event Types

A programmer can OR the following Event types into the type member of the PhEvent_t structure:

Ph_EV_KEY Is emitted when a key state changes (e.g. the user presses or releases a key). This Events rectangle set consists of a point source indicates the current keyboard focus. The Event data is a PhKeyEvent_t structure that contains at least the following members:
long key_code; Key value.
long key_state; Key-state modifier (e.g. Up, Down, Shift, Alt, Ctrl).
unsigned short key; ASCII value of key. Valid only if Pk_KS_ASCII_Valid is set in key_state.
long raw_key_code; Key code, without modifier.

Ph_EV_BUT_PRESS Emitted when the user presses a button on a pointing device. This Event's rectangle set consists of a point source that indicates the current pointer focus. The Event data is a PhPointerEvent_t structure that contains at least the following members:
PhPoint_t pos; Indicates the untranslated, absolute position of the current pointer focus. As a rule, a programmer should use the Event's rectangle set to determine coordinate positions. However, for situations that demand absolute coordinates (e.g. calibrating a touchscreen), a programmer can use pos.
unsigned short click_count; Indicates the number of clicks (e.g. a value of 2 indicates a double-click).
short dz; Indicates touch pressure. Used with touch-screens.
long buttons; Indicates which buttons the user pressed. For convenience, the following manifests have been defined:
Ph_BUTTON_SELECT normally the left button. Because a pointing device may provide this button only, a programmer should design most applications such that the user has the option to use this button to perform any task.
Ph_BUTTON_MENU can be used to invoke menus when they're available.

Ph_EV_BUT_REPEAT Emitted when the user presses on an auto-repeating button on a pointing device. This Event is emitted each time the button repeats. This Event's rectangle set consists of a point source that indicates the current pointer focus. The Event data is a PhPointerEvent_t structure (see Ph_EV_BUT_PRESS).

Ph_EV_BUT_RELEASE Emitted when the user releases a pointing-device button. This Event's rectangle set consists of a point source that indicates the current pointer focus. The Event data is a PhPointerEvent_t structure (see Ph_EV_BUT_PRESS). However, in this case, the buttons member indicates the button that was released, not the on that was pressed.

Ph_EV_PTR_MOTION Emitted when the user moves the pointing device. This Event's rectangle set consists of a point source that indicates the current pointer focus. The Event data is a PhPointerEvent_t structure (see Ph_EV_BUT_PRESS).

Large numbers of Ph_EV_PTR_MOTION Events can slow down system performance. To avoid this applications should be made Sensitive to Ph_EV_PTR_MOTION_BUTTON whenever possible, rather than to Ph_EV_PTR_MOTION.

Ph_EV_PTR_MOTION_BUTTON Emitted when the user moves the pointing device while pressing a button. This Event's rectangle set consists of a point source that indicates the current pointer focus. The Event data is a PhPointerEvent_t structure (see Ph_EV_BUT_PRESS). The buttons member indicates which buttons the user is pressing.

Ph_EV_BOUNDARY Emitted when the pointer crosses Region boundaries. The subtype member of the PhEvent_t structure indicates one of the following boundary conditions:

Ph_EV_PTR_ENTER Emitted when the pointer enters a Region. By default, enter Events are emitted to the frontmost Region that's under the pointer but only if that Region is also Opaque or Sensitive to Ph_EV_EXPOSE Events. Nevertheless, an application can force the present invention's microkernel to emit boundary Events to the frontmost Region under the pointer, without regard for that Region's sensitivity or opacity to Ph_EV_EXPOSE. To do so, the application sets the Region's Ph_FORCE_BOUNDARY flag.

Before entering a Region, the pointer usually first enters the ancestors of that Region. But with some pointing devices (e.g. touchscreens), the pointer may bypass the ancestors and enter the Region directly. If this happens, the present invention's microkernel emits an enter Event to the Region as well as to its ancestors.

Ph_EV_PTR_LEAVE Emitted when the pointer leaves a Region. A leave condition occurs only when the pointer enters a Region that's not a Child of the previously entered Region. (Child Regions are always located within the bounds of their Parents. Thus; the pointer doesn't have to leave a Parent to enter its Child. )

Ph_EV_EXPOSE Emitted by the present invention's microkernel on behalf of a Region being moved, resized, or removed from the Event Space. The Event travels away from the user and appears to originate from the removed Region. Since any Regions now exposed will see the expose Event, an application can determine which of its Regions have been uncovered. It can then redraw any portion of the Regions that become visible by passing the rectangle set to PgSetClipping( ). This Event's rectangle set describes those areas that are now exposed. This Event has no associated data.

Ph_EV_COVERED Emitted by the present invention's microkernel when a Region is created. The Event travels away from the user and appears to originate from the newly created Region. Since any Regions now covered by the new Region will see the covered Event, an application can use this Event to determine if its Regions are partially coveted. With this information, the application can then take appropriate action. For example, an animation program that consumes many processor cycles might choose to cease animation when covered, men resume animation when exposed again. The rectangle set of this Event describes only those areas that have become covered. This Event has no associated data. Ph_EV_DRAW Emitted by the Pg* functions when applications perform draw operations. The Event travels toward the user and is collected by the graphics driver. The Event has the same rectangle set as the emitting Region. The Event data is a PhDrawEvent_t structure that contains at least the following members:

Unsigned short emd_buffer_size; Size of the draw buffer, in bytes.

unsigned short context_size; Portion of the draw buffer that represents the current draw context.

unsigned long id; ID number (unique for each application in this space). The Pg* functions set this number and use it to optimize draws.

Ph_EV_DRAG Used by an application to initiate drag Events, to determine their completion, and to indicate intermediate drag-motion Events. This Event can have any of the following subtypes:

Ph_EV_DRAG_INIT To initiate a drag operation, an application must target a Ph_EV_DRAG Event (with this subtype) at the device Region. The present invention's microkernel takes care of the user's interaction with the screen pointer and the drag outline. The PhInitDrag() function provides a convenient way to initiate drag operations (it emits Ph_EV_DRAG_INIT).

Ph_EV_DRAG_COMPLETE When the user completes the drag operation, the device Region emits a Ph_EV_DRAG Event (with this subtype) toward the root Region so that the initiating application collects the Event.

Ph_EV_DRAG_MOVE Indicates intermediate drag motion. The present invention's microkernel emits this drag-Event subtype if the Ph_DRAG_TRACK flag was set in the flag member of the PhDragEvent_t structure when the drag operation was initiated. The rectangle set of drag Events doesn't contain any useful value. The Event data is a PhDragEvent_t structure that contains at least the following members:

PhRid_t rid; Indicates the Region that initiated the drag operation. The application needs to set rid when the drag is initiated.

ushort flags; Indicates which edges of the drag rectangle will track with the pointer. A programmer can OR the following values into flags:

Ph_TRACK_LEFT Left edge tracks the pointer.
Ph_TRACK_RIGHT Right edge tracks the pointer.
Ph_TRACK_TOP Top edge tracks the pointer.
Ph_TRACK_BOTTOM Bottom edge tracks the pointer.
Ph_DRAG_TRACK No drag outline is drawn and Ph_EV_DRAG MOVE Events are emitted to the initiating Region. This flag is used by applications that wish to implement their own visual interpretation of drag operations.

PhRect_t rect; Contains the coordinates of the initial, current, or final drag rectangle, depending on the drag-Event subtype value. This rectangle is relative to the origin of the Region specified in the rid member.

PhRect_t boundary; Contains the coordinates of the rectangle that constrains the drag operation. This rectangle is relative to the origin of the Region specified in the rid member.

Ph_EV_WM Both the Window Manager and applications can emit this Event. The window manager emits this Event when the application has asked to be notified. An application can emit this Event to communicate to the window manager regarding windows. Ph_EV_WM can have the following subtype:

Ph_EV_WM_EVENT The rectangle set of the Event has no useful value. The Event data is a PhWindowEvent_t structure that contains at least the following members:

unsigned short event_f; Indicates the type of the window Event. The flags a programmer can set in this member are the same as those for Pt_ARG_WINDOW_MANAGED_FLAGS and Pt_ARG_WINDOW_NOTIFY. (e.g. Ph_WM_CLOSE, Ph_WM_MENU, Ph_WM_TERMINATE)

unsigned short state_f; The current state of the window.

PhServerRid_t rid; The ID of the affected Region.

short event_state; A programmer can OR on or both of the following into event state:

Ph_WM_EVSTATE_INVERSE Perform the inverse of the action specified in the Event.

Ph_WM_EVSTATE_PERFORM The Window Manager has completed or has been asked to complete the requested action. If this Event is emitted to the Window Manager, the Event is performed by the Window Manager. If an application collects this Event, the Window Manager has completed the Event.

PhPoint_t pos; For Events that use position (e.g. menus), this member indicates the position of the item.

PhPoint_t size; For Events that use size (e.g. Resize Events), this member indicates the size of the item.

6.) PhRegion_t Structure

The PhRegion_t structure describes a Region. It contains at least the following members:

PgColor_t cursor_color; sets the cursor color for this Region. unsigned char cursor_type; Sets the cursor type for this Region. If an application sets cursor_type to 0, this. Region inherits the cursor from the Parent Region. If you OR cursor_type with Ph_CURSOR_NO_INHERIT, then Children of this Region won't inherit its cursor type. The Children will inherit the cursor from their first ancestor that doesn't have the Ph_CURSOR_NO_INHERIT flag set.

PhRid_t rid; The Region's unique identifier. The present invention's microkernel assigns this when the Region is opened.

long handle; A user-definable handle that forms part of the Event structure. Applications cart us handle to quickly pass a small amount of information along with Events. For example, the widget (Pt) functions use handle to point to a widget in memory so that they can quickly find the appropriate callback.

mpid_t owner; Indicates the process ID of the owner of this Region, unsigned short flags; Controls certain aspects of a Region and also indicates a Region's type. Of the following flags, the first two, Ph_FORCE_BOUNDARY and Ph_FORCE_FRONT, affect how a Region behaves. The others simply indicate a Region type. These type flags are set by the API functions for the convenience of applications that wish to identify a Region's purpose. For example, an application can use these flags to query the present invention's microkernel for a list of Regions that have a specific type. A programmer can OR de following into flags:

Ph_FORCE_BOUNDARY to force the present invention's microkernel to emit Ph_EV_BOUNDARY Events to this Region. If a programmer doesn't set this flag, the present invention's microkernel determines if a Region should get boundary Events by verifying that the Region is Opaque or Sensitive to Ph_EV_EXPOSE Events.

Ph_FORCE_FRONT to force the present invention's microkernel to place this Region in front of any of its Brothers that don't have this flag set, and behind any Brothers that do have this flag set.

Ph_GRAFX_Region to indicate the Region is Sensitive to draw Events (e.g. a graphics driver).

Ph_KBD_Region to indicate the Region emits keyboard Events (e.g. a keyboard driver).

Ph_PTR_Region to indicate the Region emits pointer Events (e.g. a pointer driver).

Ph_WINDOW_Region to indicate the Region is a window,

Ph_WND_MGR_Region to indicate the window manager owns the Region.

unsigned long events_sense; Determines which Event types this Region is Sensitive to. When an Event of passes through a Region that is Sensitive to it, the Event is enqueued to the application.

unsigned long events_opaque; Determines which Event types this Region is Opaque to. When an Event passes through a Region that is Opaque to it, any portion of the Event that intersects with the Region is clipped out.

PhPoint_t origin; Determines the Region's origin relative to its Parent's origin. All coordinates returned in Events and elsewhere in this structure are relative to origin.

PhRid_t parent; Indicates the Region's Parent.

PhRid_t child; Indicates the frontmost Child Region (i.e. closest to the user). If no Child Regions exist, the present invention's microkernel sets Child to 0.

PhRid_t bro_in_front; Indicates the Brother Region that's located immediately in front. If there's no Brother in front, the present invention's microkernel sets bro_in_front to 0.

PhRid_t bro_behind; Indicates the Brother Region that's located immediately behind. If there's no Brother behind, the present invention's microkernel sets bro_behind to 0.

unsigned short data_len; Determines the length of the data portion of this Region.

Data Structures

The present invention's microkernel uses a number of data structures to represent the entities that populate the "Event Space" metaphor. Data structures for Events and Regions are processed by various algorithms within the present invention in order to give the Event Space the required behaviour.

A Region is described by a data structure containing a number of elements. Each of these elements defines a specific aspect of the Region. The names and purpose for some of the elements contained by the Region data structure are:

rid Region identification number. Every Region must have a unique number.

owner This field defines which application process owns this Region.

flags This field defines miscellaneous characteristics of the Region.

sense The array of bits that define which Event types this Region is Sensitive to.

opaque The array of bits hat defines which Event types this Region is Opaque to.

state The current state of the Region.

origin The coordinate of me upper, left corner of the Region within the Event Space.

parent The Region id of the Region which is the "Parent" of this Region in the Event Space.

child The Region id of the Region which is the "Child" of this Region in the Event Space.

bro_in_front The Region id of the Region which is a Brother of this Region and in front of it.

bro_behind The Region id of the Region which is a Brother of this Region and behind it.

cursor_color The colour of the cursor displayed over this Region.

cursor_type The type of the cursor to be displayed over this Region.

Just as for the Region, another data structure defines an Event within the present invention's microkernel. An Event is described by a data structure Containing a number of elements. Each or these elements defines a specific aspect of the Event. The names and purpose for some of the elements contained by the Event, data structure are:

type Type of Event (mouse, keyboard, draw, expose, etc.)

Region The Region which i emitting the Event.

flags Some flags describing miscellaneous characteristics of the Event.

timestamp The time the Event was created.

translation An x,y offset used to offset the eve Event within the Event Space, num_rects The number of rectangles that define the Event. Normally this starts out as one, and as the Event moves through the Event Space and is split by intersecting with Opaque Regions, this rectangle count will increase in order to describe the portion of the Event which remains.

data_len The length of the data field attached to this Event.

Pevent_t (Photon Manager)

link_count The number of links to this Event. This field is used to indicate whether or not this Event data structure is currently in use or not.

Application Program Interface

The API (application program interface) used by applications communicating with the present invention's microkernel consists of a few fundamental interface routines over which the remainder of the API functionality is implemented. The three interfaces which serve to demonstrate the core functionality provided by the present invention's microkernel are:

PhRegionOpen Open a Region in the Event Space.

PhEventEmit Emit an Event from a Region.

PhEventNext Wait for an Event to hit a Region in the Event Space.

A more detailed description of each of these routines follows:

1.) PhRegionOpen—Open a Region in the Event Space

This API call allows an application program to create a Region in the Event Space that can then be used to sense Events moving in the Event Space, to emit Events of the program's choosing into the Event Space, and to modify Events moving through the Event Space. The declaration for this API function takes the form:

```
PhRid_t PhRegionOpen( unsigned fields,
                      PhRegion_t *info,
                      PhRect_t *rect,
                      void *data );
```

This declaration indicates that the function returns a data type "PhRid_t". (Photon Region id type) when the PhRegionOpen function is called. This return value will either indicate the Region id of the newly created Region, or a −1 to indicate an error. The function takes four parameters:

- unsigned fields "unsigned" indicates that the "fields" parameter is an unsigned integer of the computer's native integer size. The value passed in the "fields" parameter is used in this case as a bit field, with each of the bits in the integer representing whether or not a specific element in the "info" structure (the second parameter) is set to a specific value, or should be set to a default value by the present invention.
- PhRegion_t *info The "PhRegion_t" indicates that this parameter is a "Photon Region Structure Type", and the "*info" indicates that this is a pointer to a structure of this type. This structure is initialized in the program (before making this API call) to contain the values necessary to define the Region the application wants to create.
- PhRect_t *rect The "PhRect_t" indicates that this parameter is a "Photon Rectangle Type", and the "*feet" indicates that this is a pointer to a structure of this type. This structure is initialized to define the rectangle associated with the Region.
- void *data The "void" indicates that data pointed to by "*data" is of no specific type. This data is attached to the Region created within the present invention's Event Space.

2.) PhEventOpen—Emit an Event in the Event Space

This API call is used by an application to emit an Event from a Region in the Event Space. The declaration for this interface function takes the form:

```
int PhEventEmit(    PhEvent_t *event,
                    PhRect_t *rects
                    void *data );
```

This indicates that the function returns a data type of "int" or integer, indicating success or failure. The function takes three parameters;

PhEvent_t *event The "PhEvent_t" indicates that this parameter is a "Photon Event Type" and that "*event" is a pointer to a structure of this type. The structure will have been defined within the program before making this API call. This structure defines which Event type is being sent, which direction it will travel, which Region it is to be emitted from, etc.

PhRect_t *rects The "PhRect_t" indicates that this is a "Photon Rectangle Type" and that "*rects" points to an array of rectangles. The "event" struct passed as the first parameter contains an element which declares the number of rectangles in this array.

void *data The "void" indicates that this data is of no specific type and that "*data" points to it. The length of the data is specified by an element in the Event structure passed as the first parameter.

3.) PhEventNext—Provide synchronous Event notification

This API call allows an application to stop and wait for an Event to intersect a Region owned by the application. Other calls exist m allow the application to check for an Event without stopping, and to cause the present invention to asynchronously notify the application if an Event is pending. The declaration for this interface function takes the form:

```
int PhEventNext(    void *buffer,
                    unsigned size );
```

This indicates that the function returns a data type of "int" or integer, indicating success or failure of this call. The two parameters are:

void *buffer. The "void" indicates that the "*buffer" points to a place in memory where data of an unspecified type will be stored when the Event arrives.

unsigned size The "unsigned" indicates that this parameter is an unsigned integer, "size" indicate the size of the buffer available to store the Event received by this API call.

Example Sequence of Operation

The following text describes the operation of the present invention for the following sequence of Events:

1.) An application uses the PhRegionOpen API call to open a Region in th present invention's Event Space.

2.) The application then emits a draw Event from this Region into the Event Space.

3.) An application acting as a graphics driver receives the draw Event (using the PhEventNext API call) and renders it to the screen.

Refer to Program: "Opening a Region" below for a sample program that uses this API call.

The program starts within main() by attaching to the present invention's microkernel and then calls the open region function.

The open_region function declares some structures and initializes them with the values needed to define the Region to be created. The Region being defined is declared to be Sensitive to pointer motion and mouse button release Events. It is also setup to be Opaque to all pointer Events, draw Events and expose Events. The origin (top, left corner) of the Region is set to (100,100) and the rectangle structure defining the Region size is set to describe a Region spanning from (100,100) to (300,300).

Now that the structures defining the Region to be created are complete, the PhRegionOpen API call is issued, passing it these structures. The first parameter of this API call is set to indicate which elements in the structure have been initialized, so that the present invention will know which remaining elements should be set to default values.

PhRegionOpen API call will place the passed parameters into a message and use the underlying inter-process communication (IPC) services of the operating system (OS) to pass the request to the present invention's microkernel.

Figure 26:
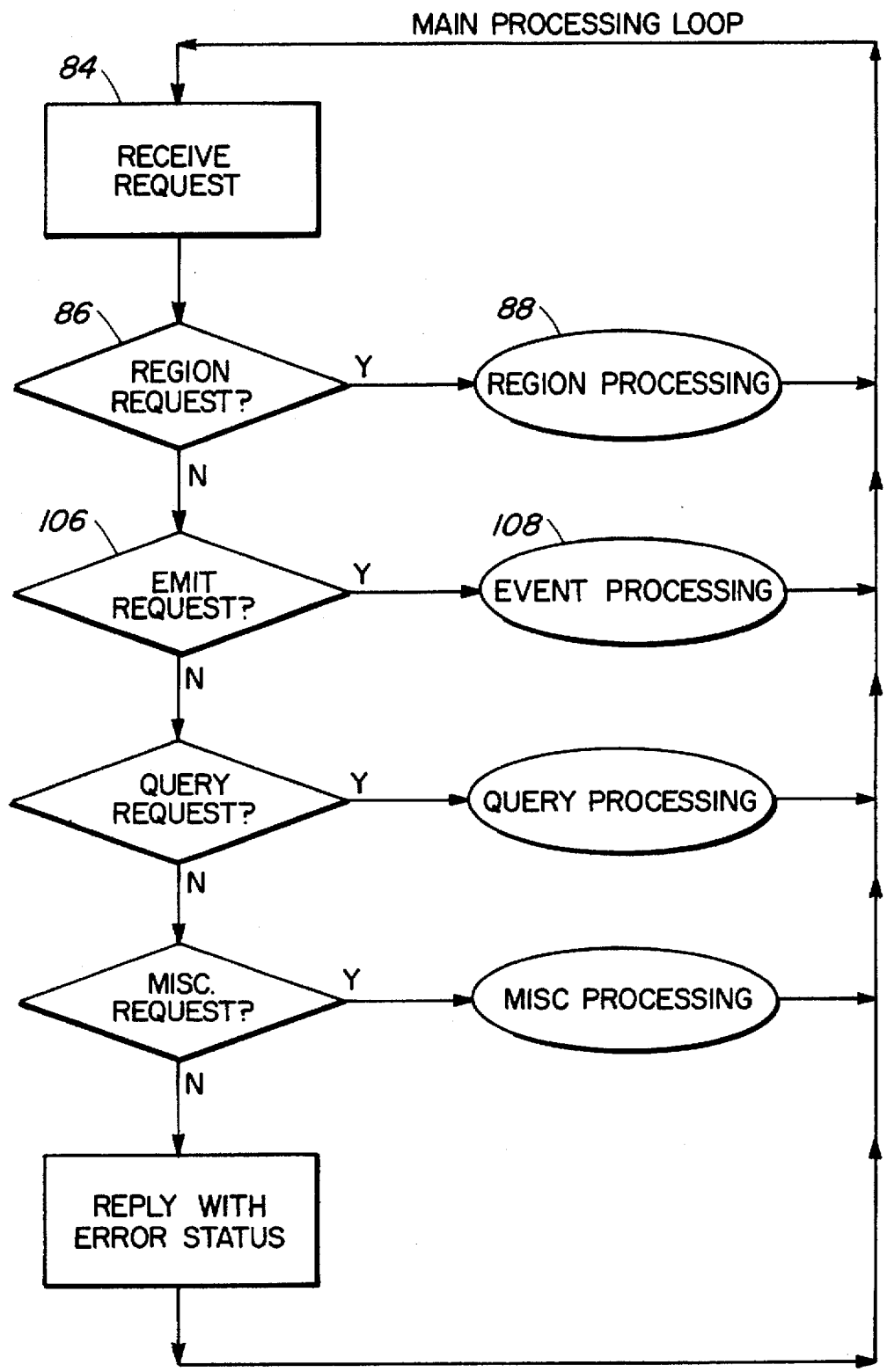
FIG. 26 is a flow chart illustrating the Main Processing loop of the present invention.

The present invention's microkernel will receive the request (84) and begin processing (see "Main Processing Loop" flow chart, FIG. 26).

Figure 27:
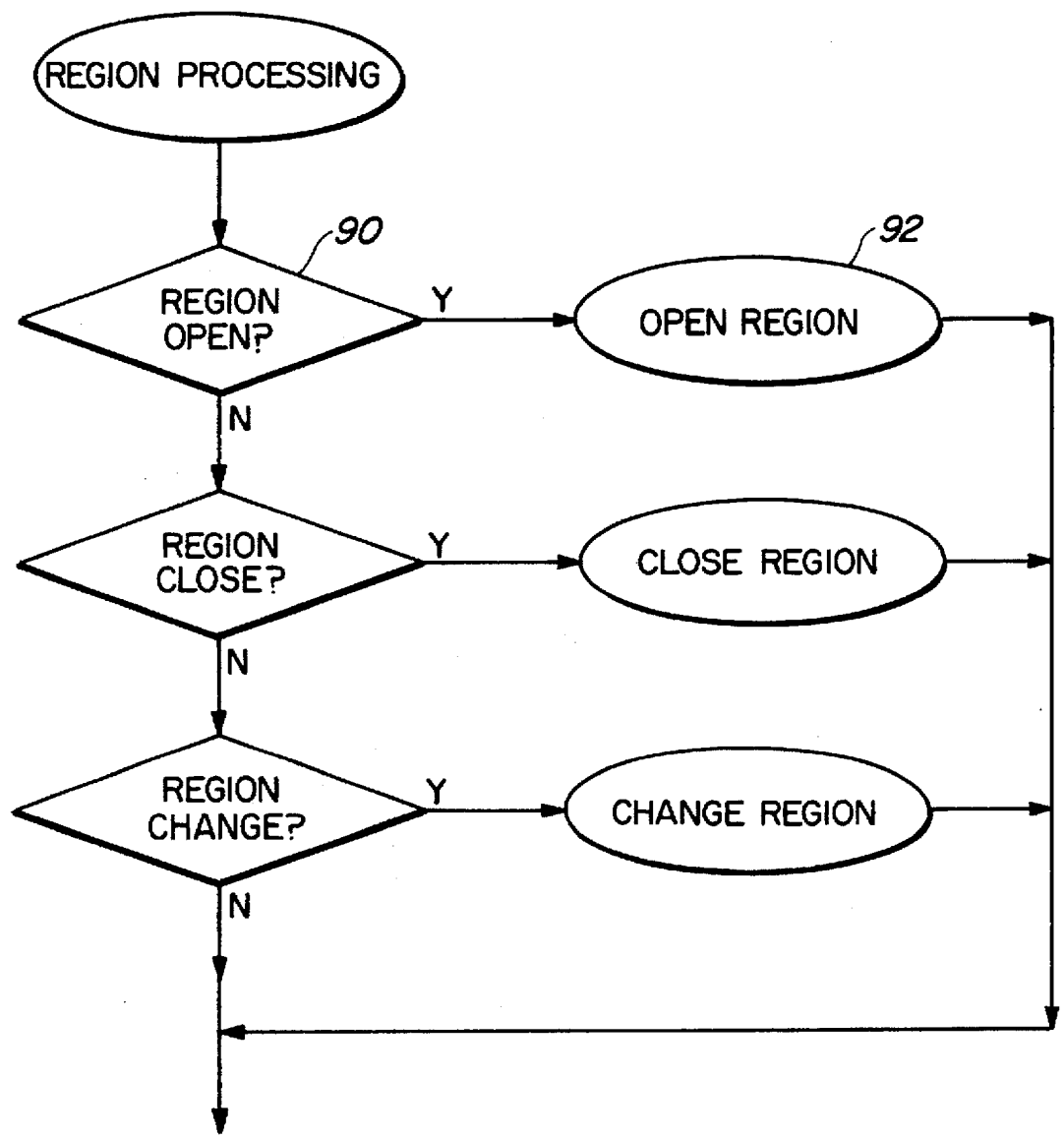
FIG. 27 is a flow chart illustrating the Region processing loop of the present invention.
Figure 29:
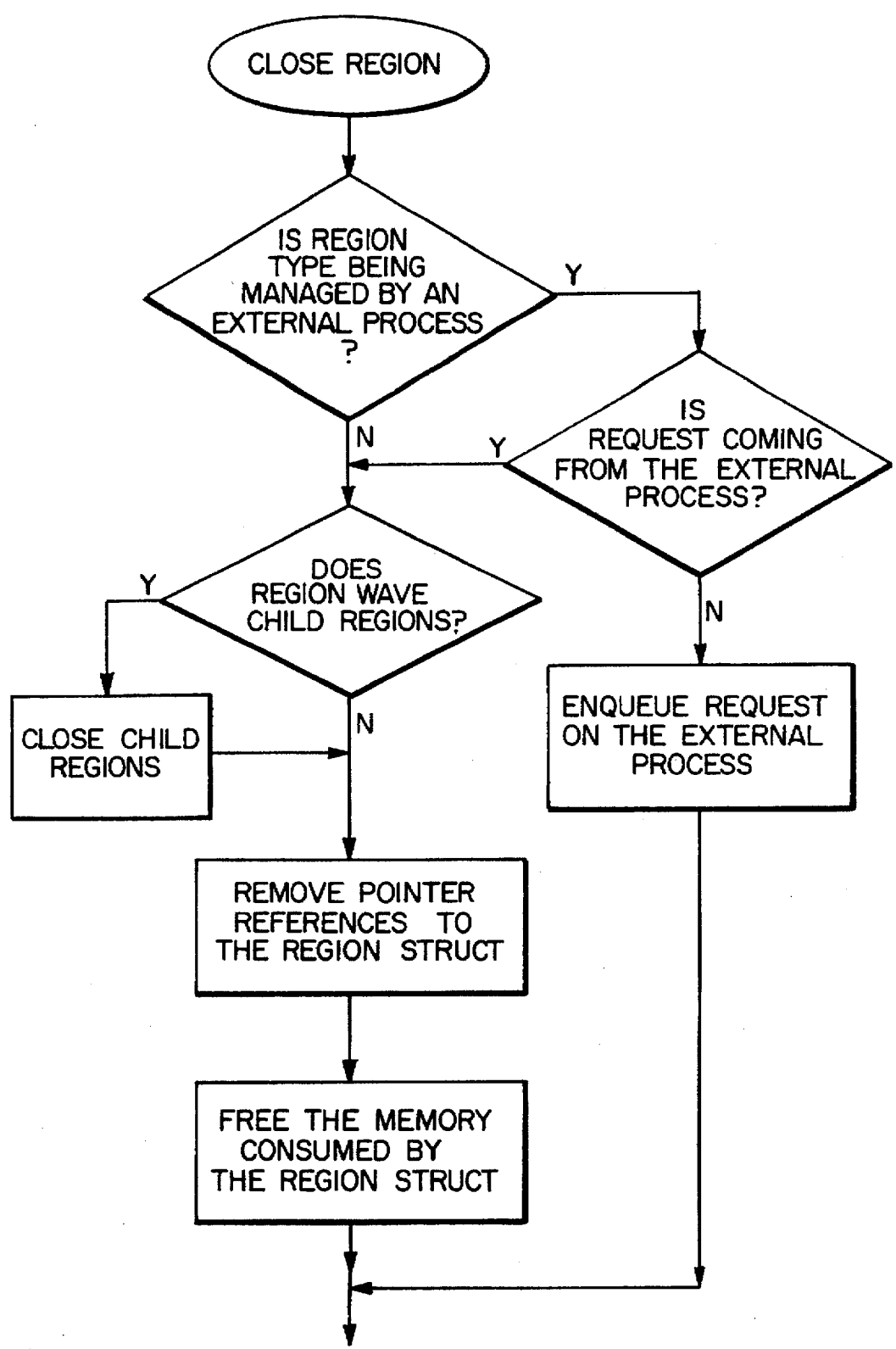
FIG. 29 is a flow chart illustrating the Close Region processing loop of the present invention.
Figure 30:
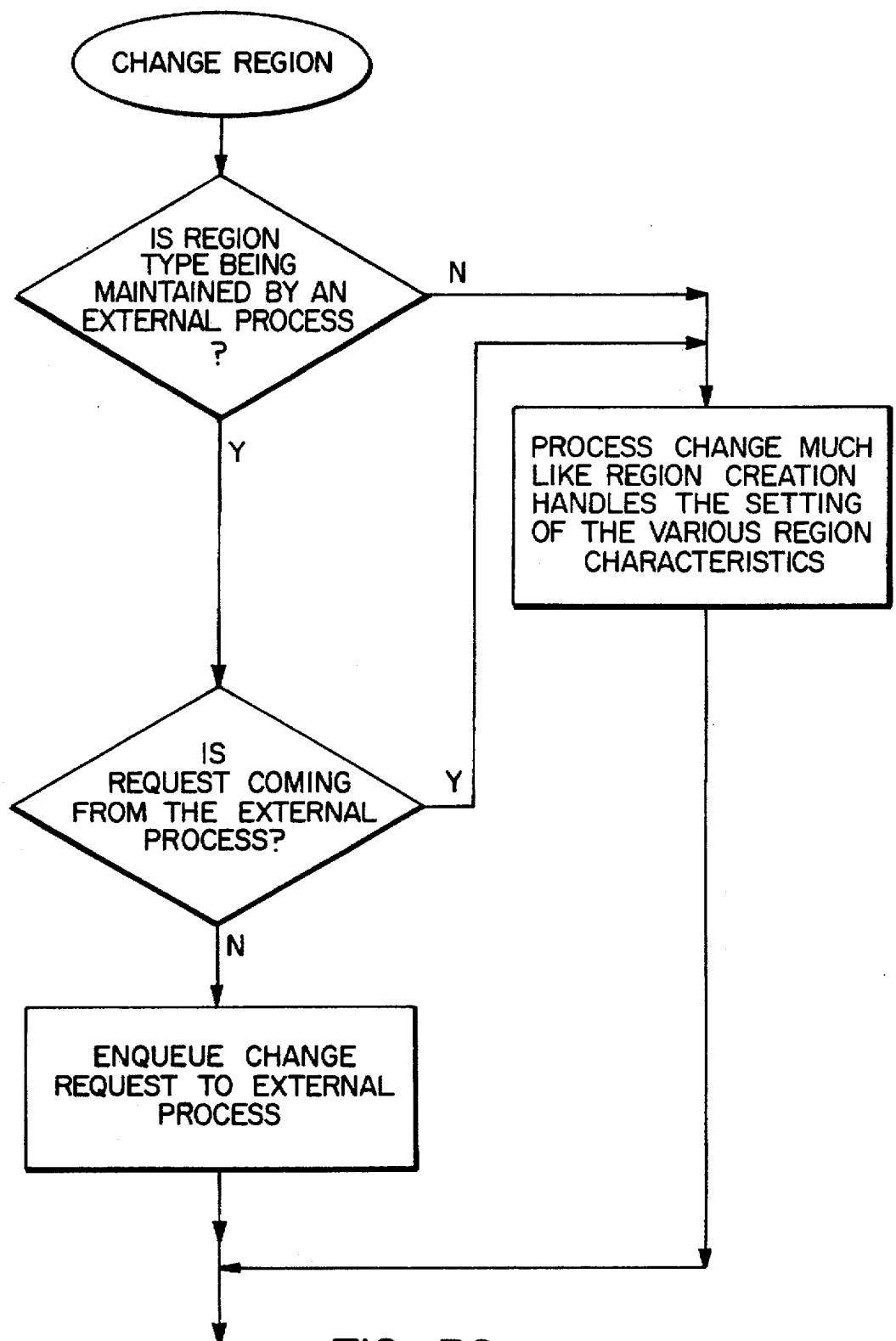
FIG. 30 is a flow chart illustrating the Change Region processing loop of the present invention.

Upon inspection (86), the present invention will recognize that this is a Region request and call the function which handles Regions (88) (see "Region Processing" flow chart, FIG. 27). That function will recognize (90) that a Region open request was received and call a function (92) to inform this operation. (FIGS. 29 and 30 illustrate flow charts for the Close Region and Change Region functions of the Region Processing flow chart.)

Figure 28:
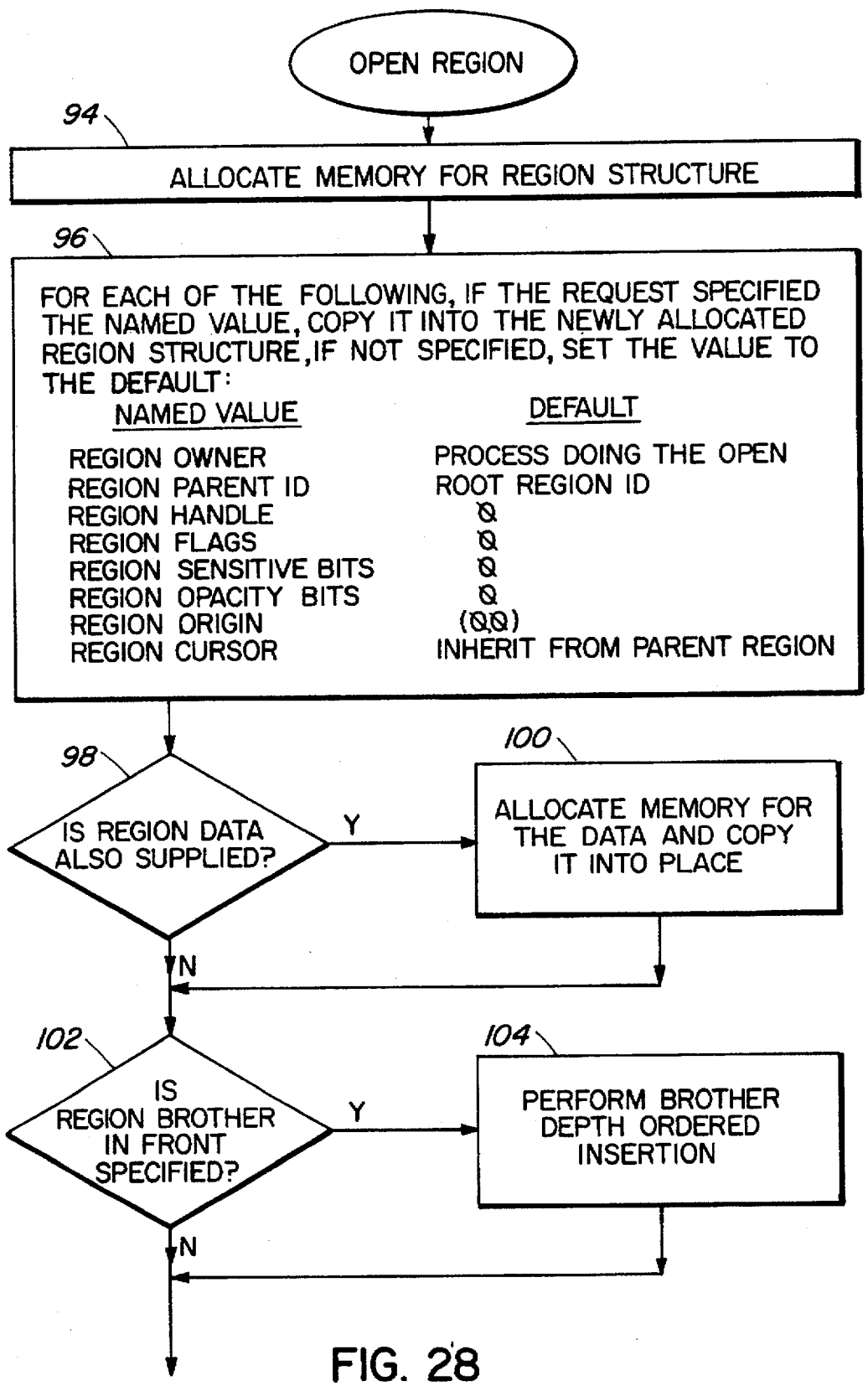
FIG. 28 is a flow chart illustrating the Open Region processing loop of the present invention.

The open Region function (see "Open Region" flow chart, FIG. 28) will allocate memory for a draw Region structure (94) and then inspect the first parameter passed rate this API call. Using the bits set in this field, the open_Region function will know which elements in the second parameter are set to application specified values, and which should be set to defaults. The elements within the structure will be modified accordingly (96).

If upon inspection (98) some data is found to be attached to this Region, memory will be allocated for the data, the data copied into the allocated memory, and this memory will be attached to the previously allocated Region structure (100).

If upon insertion (102) Region Brother is found to be specified, the present invention's microkernel will locale the specified Region and attach the newly created Region appropriately (104).

Once the Region processing within the present invention's microkernel is complete, the application program continues processing. In this case, the application proceeds to draw a black rectangle covering the rectangle just placed into the present invention's Event Space. It does this by calling PtSetRegion to specify which Region to draw the rectangle from, calling PgSetDrawColor to specify a colour (in this example, black) and PgDrawFillRect to actually draw the black, filled rectangle.

The draw calls just executed actually result in a series of draw command codes being deposited into a buffer within the application's private memory space. When the application calls PgFlush( ), this draw buffer is passed to the present invention's microkernel. The PgFlush() API routine actually uses a variant of the PhEventEmit API call to pass this draw buffer to the microkernel, instructing the present invention to emit the draw buffer as an draw Event travelling away from the Region in the Event Space towards the user (away from the root plane).

Figure 31A:
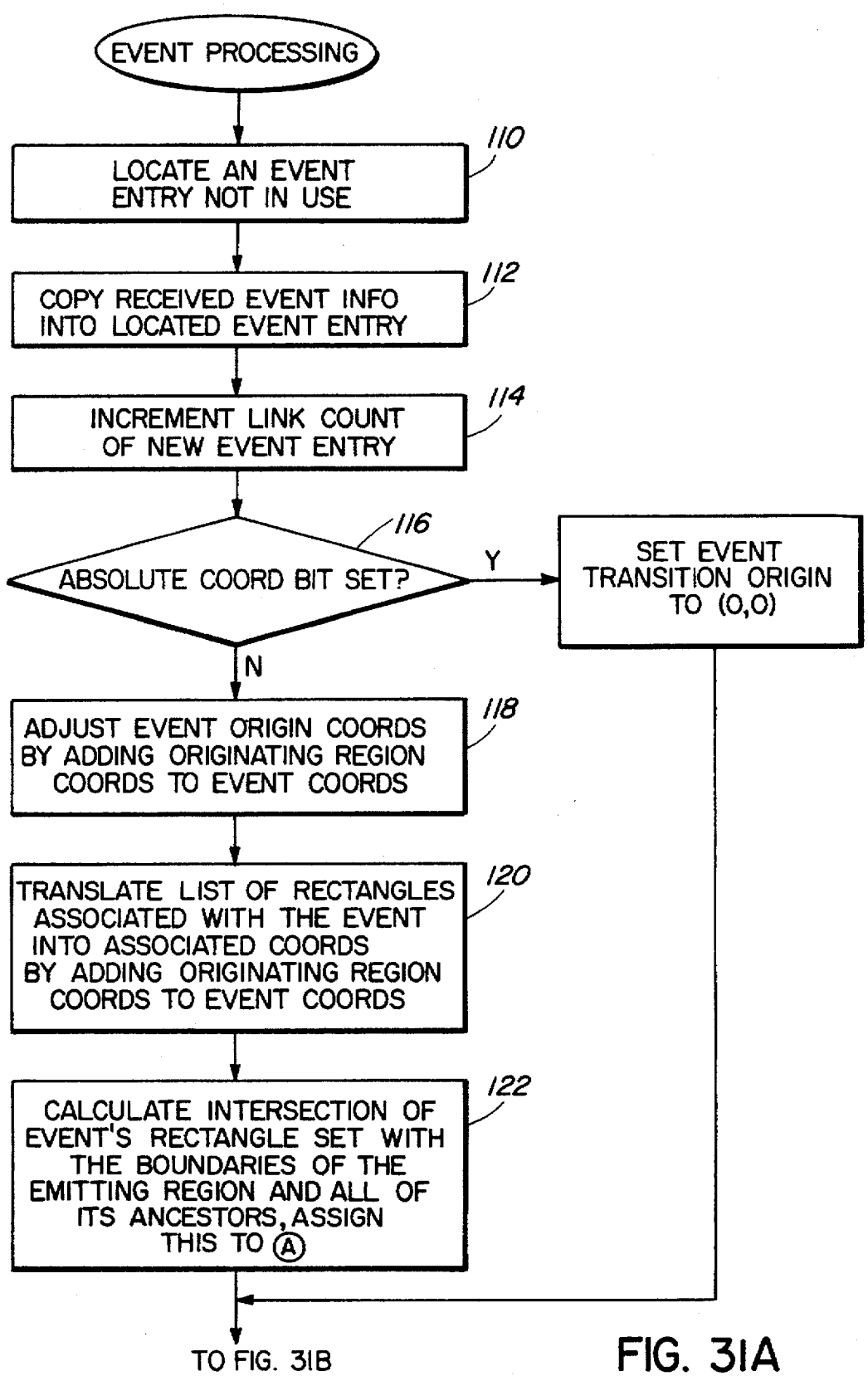
FIG. 31A is a flow chart illustrating the Event Processing loop of the present invention.
Figure 31B:
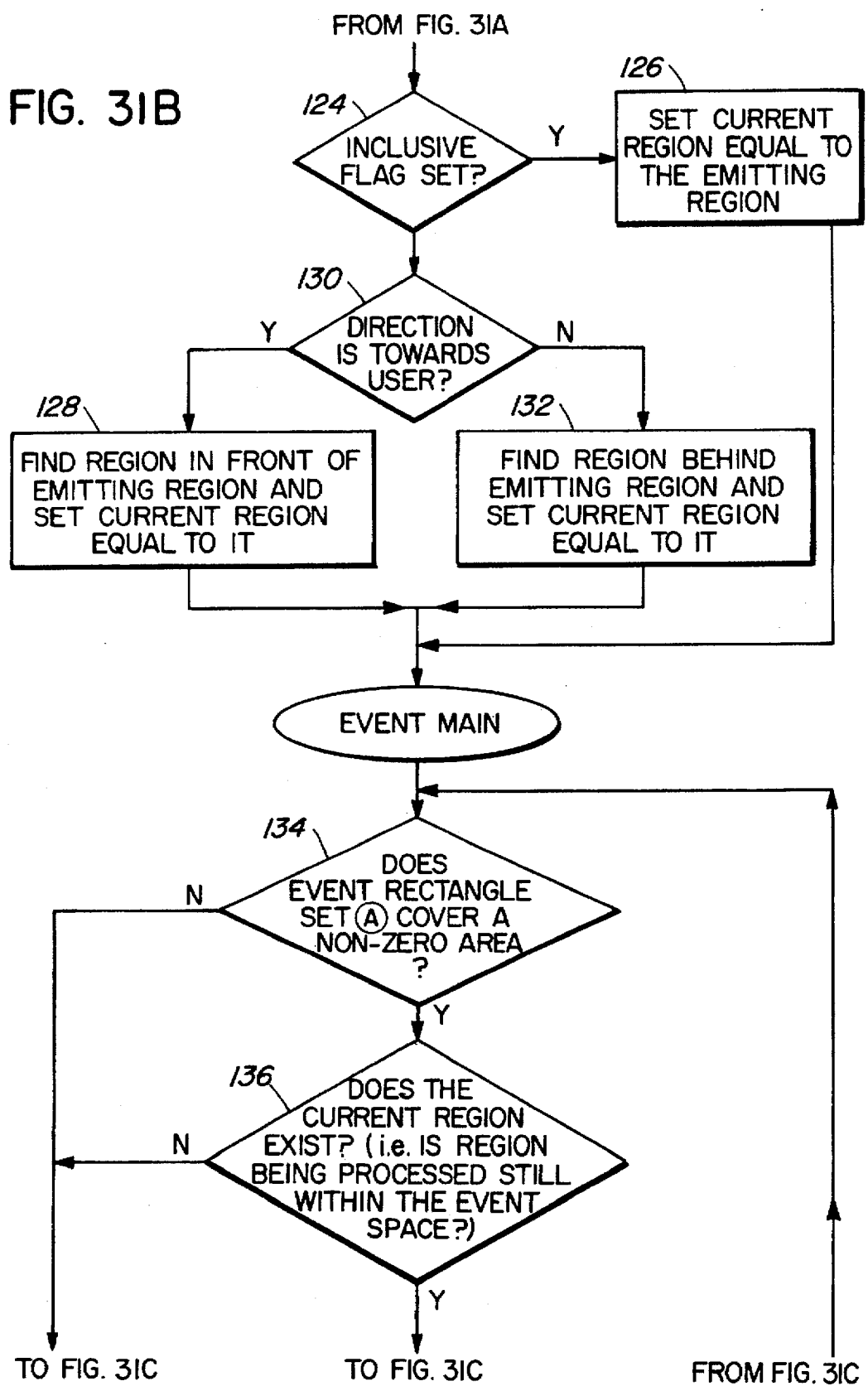
FIG. 31B is a continuation of the flow chart illustrating the Event Processing loop of ale present invention.
Figure 31C:
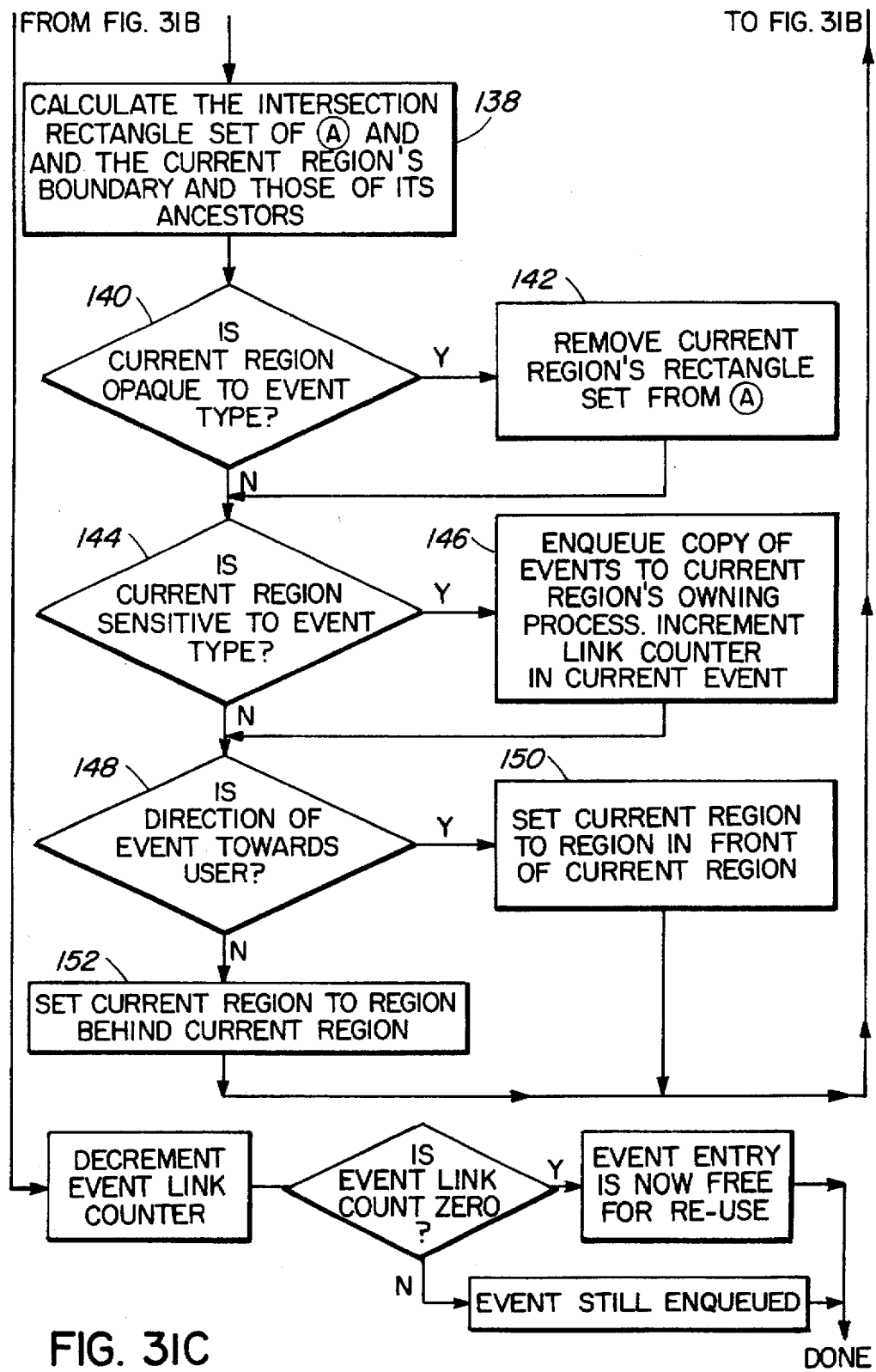
FIG. 31C is a continuation of the flow chart illustrating the Event Processing Loop of the present invention.

When the present invention receives the draw Event (see the "Main Processing Loop" flow chart, FIG. 26) it examines it to determine what type of request it represents (106), and then calls the Event Processing function (108) in the microkernel (see the "Event Processing" flow chart, FIG. 31 A-B).

The Event processing function first locates an Event entry within the pool of Event entries that is not currently in use (110) and then copies. The received draw Event into this Event entry (112).

The link count on this entry is incremented (114), causing it to be set from zero (not in use) to one (in use in one place within the present invention's microkernel, the Event processing routine).

The absolute coordinate bit within the Event entry is examined (116) to determine if the coordinates of the data within the Event need to be translated from Region-relative coordinates to the present invention's absolute coordinates.

If the coordinates ate: not already expressed in absolute terms, then the Event processing function will adjust the Event origin coordinates (118) from the Region-relative form the application originally supplied to absolute coordinates within the present invention's Event Space. The rectangle set associated with the Event will also be translated (120) from Region-relative coordinates to absolute coordinates if necessary.

The intersection of the Event's rectangle set and the originating Region will be computed (122). This ensures that the Event being emitted is properly constrained to the boundary of the originating Region.

If upon examination (124) the inclusive bit is set in the Event entry, then the current_Region will be set equal to the Region the Event is being emitted from (126). If not, then the current_Region will be set to the Region in front of the originating Region (128) when the Event direction is found 130) to be towards the user (away from the root plane), or set to the Region behind the originating Region (132) when the Event direction is towards to root plane (see FIG. 3B for the continuation of the Event Processing flow chart)

If the Event's rectangle set describes a non-zero area (134), and the Event's current_Region is still between the root plane and the user as determined at (136), the following processing will be done:

The Event's rectangle set is set to the intersection of the current Region and the Event's rectangle set (138).

If upon examination (140) the current_Region is found to be Opaque to the Event type (a draw Event in this case), then the current_Region's rectangle set is "clipped" from the Event's rectangle set (142). This behaviour has the effect of overlapping application Regions (or windows) preventing draw Events from underlying Regions overwriting the frommost windows. The draw Event (of which the rectangle set is a component) has been modified to reflect it's intersection with the Opaque Region.

If upon examination (144) the current_Region is found to be Sensitive to the Event type (a draw Event in this case), then the present invention will queue a copy (146) of the draw Event (including its rectangle set) to be sent to the application process which owns the Region. The link count in the Event entry is incremented to reflect that the Event entry is in use in more than one place in the present invention's microkernel. For this example, we will assume that a graphics driver application is present in the system, and that it has placed a Region Sensitive to draw Events in front of the application. As a result, a copy of the draw Event will he queued to go to the graphics driver (which is nothing more than an application program's Region Sensitive to draw Events). The link count will be two because the Event entry is in use by both the Event processing function and the Event queue.

Since the direction of travel for the draw Event is towards the user (148), the current_Region will be set to the Region in front of the Region just processed (150). Had the direction been found (148) towards the root plane, then the current_ Region would have been set to the Region behind the current_Region (152).

This is the end of the while loop started above.

At this point, the draw Event would have either had it's rectangle set reduced such that it covered zero area (essentially, the Region of origin for the draw Event is completely hidden by Opaque Regions) or had passed outside of the root-plane-to-user span of the Event Space. The link count of the Event entry would have been decremented, and if the count went to zero, the Event entry would be free for re-use by another Event. Since our example resulted in the draw Event also being queued to a graphics driver application, the link count would have been decremented from two to one, and therefore not released from memory.

The present invention's microkernel will dequeue the draw Event to the graphics driver application that owned the Region Sensitive to draw Events, and the link count will again be decremented. Having been decremented to zero, the Event entry would be free for re-use.

The graphics driver would be waiting for an Event from the present invention's microkernel because of having used the PhEventNext API call (or a variant). When the present invention dequeued the draw Event, this would cause the draw Event to be passed to the graphics driver application (using the underlying OS's IPC services) and the graphics driver application would begin processing the draw Event.

A graphics driver application for the present invention is nothing more complicated than a program which knows how to examine the draw Event and render onto the display the individual draw requests contained within the draw Event. For this example, the draw request would result in a black rectangle being drawn to the screen at the coordinates that corresponded to the position of the original application's position in the present invention's Event Space (100,100).

Program; Opening a Region

This example opens an Opaque Region, with the root Region as its Parent. The program senses any pointer motion Events that pass through its Region and draws a rectangle at the current pointer position. If the user clicks in the Region, the program terminates.

```
#include <stdio.h>
#include <stdlib.h>
#include <Ph.h>
PhRid_t open_region( void )
{
PhRegion_t region;
PhRect_t rect;
PhRid_t rid;
/* Wish to have pointer motion events enqueued to us */
memset (&region, 0, sizeof (PhRegion_t));
region.events_sense = Ph_EV_PTR_MOTION | Ph_EV_BUT_RELEASE;
/* Wish to be opaque to all pointer-type events and
       be visually opaque */
region.events_opaque = Ph_EV_PTR_ALL | Ph_EV_DRAW |
                              Ph_EV_EXPOSE;
/* Origin at (100,100) relative to root */
region.origin.x = region.origin.y = 100;
/* Open region from (absolute) (100,100) to (300,300) */
rect.ul.x = rect.ul.y = 0;
rect.lr.x = rect.lr.y = 200;
rid = PhRegionOpen(    Ph_REGION_EV_SENSE |
                       Ph_REGION_EV_OPAQUE |
                       Ph_REGION_ORIGIN |
                       Ph_REGION_RECT, &region, &rect, NULL);
if( !rid ) {
    fprintf( stderr, "Couldn't open region " );
    exit( EXIT_FAILURE );
}
/* black out the region */
PgSetRegion( rid );
PgSetDrawColor( Pg_BLACK );
PgDrawFillRect( &rect );
PgFlush();
return( rid );
}
void draw_at_cursor( PhPoint_t *pos )
{
  PhRect_t rect;
  static int count = 0;
  PgColor_t color;
  rect.ul.x = pos->>x - 10;
  rect.ul.y = pos->>y - 10;
  rect.lr.x = pos->>x + 10;
  rect.lr.y = pos->>y + 10;
  switch( count % 3 ) {
  case 0;
     PgsetDrawColor( Pg_RED );
     break;
  case 1:
     PgSetDrawColor( Pg_GREEN );
     break;
  default:
     PgSetDrawColor( Pg_BLUE );
  }
  PgDrawFillRect( &rect );
  PgFlush();
}
main( int argc, char *argv[])
{
```

```
-continued

PhEvent_t *event;
int go = 1;
if( NULL == PhAttach( NULL, NULL ) ) {
    fprintf( stderr, "Couldn't attach a Photon channel. " );
    exit( EXIT_FAILURE );
}
if( -1 == open_region() ) {
    fprintf( stderr, "Couldn't open region. " );
    exit( EXIT_FAILURE );
}
if( NULL == (event = malloc( sizeof( PhEvent_t) + 1000) ) )
{
    fprintf( stderr, "Couldn't allocate event buffer. " );
    exit( EXIT_FAILURE );
}
while( go ) {
    if( PhEventNext( event, sizeof(PhEvent_t ) + 1000) ==
                            Ph_EVENT_MSG ) {
        if( event->type == Ph_EV_PTR_MOTION )
            draw_at_cursor( (PhPoint_t *)PhGetRects( event ) );
        else
            go = 0;
    } else
        fprintf( stderr, "Error. " );
}
```

Numerous modifications, variations and alterations can be made to the particular embodiments disclosed without departing from the scope of the invention which is defined by the claims.

The embodiments of the invention in which an exclusive property of privilege is claimed are defined as follows:

1. A system for managing an interaction of a plurality of programs, comprising:

means for storing a plurality of sets-of characteristics, a set of characteristics for each program to be managed, each set of characteristics including an input signal type characteristic and a signal modification characteristic, said input signal type characteristic indicative of input signal types to which a corresponding program is responsive, said signal modification characteristic indicative of input signal types that can be modified by said program;

means, responsive to an input signal received from a first program of said plurality of programs, said input signal having a set properties, for interrogating each set of characteristics in a predetermined sequence, determining whether each program corresponding to each set of characteristics is responsive to said input signal, determining whether said set of properties are to be modified by each program that is responsive to said input signal, modifying said set of properties responsive to said determining whether said set of properties are to be modified, and communicating one or more output signals, each output signal being each program determined to be responsive to said input signal, said output signal corresponding to said input signal; and means defining an event space, said event space having at least three dimensions and representing an operating environment of said plurality of programs, said event space having a root plane at a first end of said event space, and wherein, each set of characteristics includes a dimensions characteristic and a position characteristic, said dimensions characteristic indicative of a set of dimensions of a planar area within said event space, said position characteristic indicative of a position of said planar area within said event space and relative to at least a second planar area within said event space.

2. The system of claim 1 further includes:

means defining an event space, said event space having at least three dimensions and representing an operating environment of said plurality programs said event space having a root plane at a first end of said event space, and wherein, said set of properties includes a dimensions property and a position property, said dimensions property indicative of a set of dimensions of a planar area within said event space, said position property indicative of a position of said planar area within said event space and relative to at least a second planar area within said event space.

3. The system of claim 2 wherein said dimensions property indicates said planar area is within a first planar area corresponding to said first program and wherein said position property is indicative of a position of said planar area with respect to said first planar area.

4. The system of claim 3 wherein said dimensions property is initially the dimensions of said first planar area.

5. A computer implemented method comprising:

storing, responsive to a region open signal emitted by a first program, at least one region data set, said region data set including a set of region characteristics specified by said region open signal, said set of region characteristics including a dimensions characteristic representative of the dimensions of a planar area, a position characteristic specifying a position of said planar area with respect to at least one other planar area, an event type characteristic indicative of types of event emit signals to which said first program responds, and an event modification characteristic indicative of types of event emit signals whose properties are affected by said first program;

storing, responsive to an event emit signal from a second program, an event data set, said event data set including a set of event properties specified by said event emit signal, said set of event properties including an event emit signal type property, an interrogation path property, a dimensions property, and a position property, said dimensions property indicative of the dimensions of a planar event area, said position property indicative of the position of said planar event area with respect to a region area of said second program;

responsive to said event emit signal from said second program, performing the following steps, interrogating each stored region data set in a sequence specified by said interrogating path property; and for each stored region data set determining whether said planar event area overlaps with each planar ea represented by each set of dimensions characteristic, if so, determining whether a corresponding event type characteristic corresponds to said event emit signal type property, and if so, transmitting an output signal to a corresponding program, said output signal specifying said set of event properties, and determining whether a corresponding event modification characteristic corresponds to said event emit signal type property, and if so, modifying said dimensions property by removing a corresponding overlapping area between said planar event area and a corresponding planar area represented by a correspond dimensions characteristic, said modifying said dimensions property occurring prior to interrogating a next stored region data set.

6. A computer implemented method of communicating information between programs, comprising:

constructing an event space, said event space having at least three dimensions and defining a coordinate system for use by said programs;

generating a first event signal in response to a sender program, said first event signal having an event type and an area property, said area property defining an event area within said event space;

testing a first program to determine whether said event area intersects a fast program area, said first program area being defined within said event space and corresponding to said first program, if so, then performing the following steps, testing said first program to determine whether said first program is sensitive to said first event signal by testing said event type, if so, transmitting an output signal to said first program, said output signal including information corresponding to said first event signal, and testing said first program to determine whether said first program is to modify said first event signal by testing said event type, if so, modifying said area property by clipping said first program area from said event area.

7. The method of claim 6 where prior To said modifying said area property, said area property defines a rectangle having an origin, a length, and a width, equal to an area used by said sender program and after said modifying said area property, said area property defines a plurality of rectangles, each rectangle including and origin, a length and a width.

8. The method of claim 6 where said first event signal corresponds to a pointer device input event and where said area property defines a point and does not define an area.

9. The method of claim 6 where said first event signal is one of a key press, a button press, a pointer device move, a boundary crossing, and a draw function.

10. The method of claim 6 where said event area is wholly within said first program area, and said modifying said area property includes having said first event signal cease to exist.

11. The method of claim 10 where said fast event signal corresponds to handwriting input, said fast program includes a handwriting recognition program, said first program is sensitive to said first event signal, and said method includes the step of:

said first program translating said handwriting input to a textual representation of said handwriting input; and said first program causing an output of a second event signal, said second event signal corresponding to said textual representation.

12. The method of claim 10 where said event space includes a root region, said root region corresponding to a root program, said root region defining an area across said event space, and said method includes the step of receiving said first event signal at said root region and causing said first signal event to cease to exist.

13. The method of claim 6 where said output signal defines a translated area, said translated area defining said event area relative to said first program area instead of to said event space.

14. The method of claim 6 further including said first program polling to determine whether said output signal has been generated.

15. The method of claim 6 further including said first program waiting to receive said output signal.

16. The method of claim 6 further including said first program registering a notification process, and said generating said output signal includes calling said notification process.

17. The method of claim 6 where said first program is a graphics driver program, said sender program is an input manager program, said first event signal corresponds to an input device draw event, said first event signal being in response to said input manager program receiving an input device signal, and where, responsive to receiving said output signal, said first program causes a cursor to be drawn.

18. The method of claim 17 where said event space includes a first area defined to be closest to a user, where said fi program area is closer to said first area than an area corresponding to said sender program, and where said input signal event includes a direction property, and where said direction property is towards said first area.

19. The method of claim 6 where said first program area extends entirely across said event space, where said fast program is sensitive to every event type, and where first program logs said information from said first event signal.

20. The method of claim 6 further including testing a second program to determine whether said event area intersects a second program area corresponding to said second program, and where said first event signal further includes a direction property and where said direction property determines whether or not said testing said first program occurs prior to said testing said second program.

21. The method of claim 6 where said sender program is to communicate said first event signal directly to said first program and where said first event signal includes a sender identifier property and an inclusive property, and where said generating said first event signal includes said sender identifier property being set to a program identifier of said first program and said inclusive property being set to cause said event signal to be emitted to said first program before emitting said event signal to said event space.

* * * * *

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

Page 1 of 8

It is certified that error appears in the above-identified patent and that said Letters Patent is hereby corrected as shown below:

Title page, in the "Other Publications" section, line 4, Change "QNZ" to --QNX--.

Title page, in the Abstract, line 6, Change "inputs" to --input--.

Column 1, line 47, Change "functionally" to --functionality--.

Column 2, line 24, Change "requires" to --require--.

Column 3, line 34, Change "it's" to -- its--.

Column 3, line 67, Change "inputs" to --input"

Column 4, line 58, Change "invention s" to --invention's--.

Column 5, line 16, Change "Brent" to --Event--.

Column 5, line 47, Change "loop of ale present" to-- $loop$ of the present--.

Column 6, line 17, Change "of an virtual" to --of a virtual--.

Column 7, line 1, Change "Space (12). A. Region" to --Space (12). A Region--.

Column 7, line 15, Change "Events" to --Event's--.

Column 9, line 3, Change "Ravel" to --travel--.

Column 9, line 35, Change "coordinate. In" to --coordinate in--.

Column 9, line 67, Change "an: range" to --are range--.

Column 10, line 48, Delete "]".

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 10, line 66, Change "patent" to --Patent--.

Column 11, line 6, Change "In fire present" to --In the present--.

Column 11, line 13, Change "of theft Parents" to --of their Parents--.

Column 11, line 14, Change "When pinning a" to --When opening a--.

Column 11, line 29, Change "paced" to --placed--.

Column 11, line 46, Change "is" to --1's--.

Column 12, line 22, Change "this remits in" to --this results in--.

Column 12, line 46, Change "see ti section" to --see the section--.

Column 12, line 60, Change "bro_in_from-indicates" to --bro_in_front-indicates--.

Column 13, line 3, Change "bro_front" to --bro_in_front--.

Column 13, line 20, Change "In the first member" to --in the rid member--.

Column 13, line 21, Change "patent" to --Patent--.

Column 13, line 21, Change "0. Then" to --0, then--.

Column 13, line 39, Change "of an specified Brothers" to --of specified Brothers--.

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 13, line 62, Change "Programmer's Reference" to --QNX Programmer's Reference available from QNX Software Systems, Ltd.--.

Column 13, line 63, Change "reels" to --rects--.

Column 13, line 65, Change "reels" to --rects--.

Column 14, line 13, Change "Region without" to --Region, without--.

Column 15, line 43, Change "tend to classified" to --tend to be classified"

Column 15, line 55, Change "time" to --the--.

Column 15, line 57, Change "forms" to --forming--.

Column 16, line 7, Change "The job of e graphics" to --The job of the graphics--.

Column 16, line 9, Change "on-whatever" to --on whatever--.

Column 16, line 17, Change "at" to --that--.

Column 16, line 56, Delete "the".

Column 17, line 11, Change "ditto" to --Ditto--.

Column 17, line 14, Delete "the present invention".

Column 17, line 28, Change "Primer" to --Printer--.

Column 17, line 31, Change "in     front of tie" to --in front of the--.

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 17, line 51, Change "green" to --screen--.

Column 18, line 15, After "green," insert --and blue, for a--

Column 18, line 21, Change "application" to --applications--.

Column 18, line 59, Change "on (i.e. The active window)" to --on (i.e. the active window)--.

Column 19, line 33, Change "each." to --each--.

Column 20, line 23, Change "m" to --to--.

Column 20, line 23, Change "a small mount" to --a small amount--.

Column 20, line 25-28, This paragraph should be full-justified with the first line indented.

Column 20, line 66, "time_t timestamp" should be the start of a new paragraph.

Column 21, line 22, Change "Events" to --Event's--.

Column 21, line 23, Change "point source indicates" to --point source that indicates--.

Column 22, line 4, Change "on" to --one--.

Column 23, line 2, Change "coveted" to --covered--.

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 23, line 6, Change "men" to --then--.

Column 23, line 9, After "data.", begin a new paragraph.

Column 23, line 16, Change "emd_buffer_size" to --cmd_buffer_size--.

Column 24, line 27, Change "on" to --one--.

Column 24, line 49, "unsigned char cursor_type" should be in bold characters and the start of a new paragraph.

Column 24, line 51, Change "this." to --this--.

Column 24, line 61, Change "cart us" to --can use--.

Column 25, line 11, Change "de" to --the--.

Column 25, line 34, Delete "of".

Column 26, line 13, Change "define" to --defines--.

Column 26, line 15, Change "hat" to --that--.

Column 26, line 18, Change "me" to --the--.

Column 26, line 35, Change "Containing" to --containing--.

Column 26, line 36, Change "or" to --of--.

Column 26, line 38, Change "Event." to --Event--.

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 26, line 40, Change "i" to --is--.

Column 26, line 44, Delete "eve".

Column 27, line 43, Change "feet" to --rect--.

Column 28, line 16, Change "m" to --to--.

Column 28, line 40, Change "th" to --the--.

Column 28, line 49, Change "call the open region" to --calls the open_Region--.

Column 29, line 10, Change "inform" to --perform--.

Column 29, line 13, Change "chart,)" to --chart.)--.

Column 29, line 16, Change "rate" to --into--.

Column 29, line 28, Change "locale" to --locate--.

Column 29, line 47, Change "an" to --a--.

Column 29, line 58, Change "copies. The received" to --copies the received--.

Column 30, line 1, Change "ate:" to --are--.

Column 30, line 20, Change "to" to --the--.

Column 30, line 35, Change "it's" to --its--.

Column 30, line 48, Change "he" to --be--.

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 30, line 60, Change "it's" to --its--.

Column 32, line 44, Change "couldn't open region" to --couldn't open region\n--.

Column 33, line 6, Change "a Photon channel." to --a Photon channel.\n--.

Column 33, line 10, Change "open region" to --region.\n--.

Column 33, line 15, Change "event buffer." to --event buffer.\n--.

Column 33, line 26, Change "Error." to --"Error.\n--.

Column 33, line 45, After "set", insert --of--.

Column 34, line 34, Change "programs said event" to --programs, said event--.

Column 35, line 16, Delete "ea". insert --area--

UNITED STATES PATENT AND TRADEMARK OFFICE
CERTIFICATE OF CORRECTION

PATENT NO. : 5,745,759
DATED : April 28, 1998
INVENTOR(S) : Patrick M. Hayden et al.

It is certified that error appears in the above-identified patent and that said Letters Patent is hereby corrected as shown below:

Column 35, line 44, Change "fast" to --first--.

Column 35, line 59, Change "To" to --to--.

Column 35, line 64, Change "and" to --an--.

Column 36, line 8, Change "fast" to --first--.

Column 36, line 9, Change "fast" to --first--.

Column 36, line 43, Change "fi" to --first--.

Column 36, line 48, Change "fast" to --first--.

Signed and Sealed this

Fourth Day of May, 1999

*Attest:*

Q. TODD DICKINSON

*Attesting Officer*       *Acting Commissioner of Patents and Trademarks*